US006487369B1

(12) United States Patent
Sato

(10) Patent No.: US 6,487,369 B1
(45) Date of Patent: Nov. 26, 2002

(54) CAMERA WITH BLUR REDUCING FUNCTION

(75) Inventor: Tatsuya Sato, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/557,677

(22) Filed: Apr. 25, 2000

(30) Foreign Application Priority Data

Apr. 26, 1999 (JP) ............................................ 11-118018
Apr. 26, 1999 (JP) ............................................ 11-118020
Apr. 26, 1999 (JP) ............................................ 11-118022

(51) Int. Cl.⁷ ............................................ G03B 17/00
(52) U.S. Cl. ....................................................... 396/52
(58) Field of Search ............................ 396/52, 53, 54, 396/55, 263, 266, 354, 358

(56) References Cited

U.S. PATENT DOCUMENTS 5,150,150 A * 9/1992 Enomoto ..................... 396/53
5,307,113 A * 4/1994 Egawa ........................ 396/54
5,708,863 A   1/1998 Satoh et al.
5,790,490 A   8/1998 Satoh et al.

FOREIGN PATENT DOCUMENTS

JP      5-204012    8/1993
JP      5-204013    8/1993
JP      5-204014    8/1993

* cited by examiner

Primary Examiner—Russell Adams
Assistant Examiner—Arthur Smith
(74) Attorney, Agent, or Firm—Frishauf, Holtz, Goodman & Chick, P.C.

(57) ABSTRACT

An exposure start determining section executes exposure start determination to reduce shaking during exposure, on the basis of the output of the shake detecting/computing section. At this time, an exposure start method used in the exposure start determining section is changed in accordance with a change condition set in a condition setting section. For example, in accordance with an exposure start instructing operation (a releasing operation), preparatory operations (such as a mirror-raising operation, a lens stop down operation, etc.) for exposure are executed. When the preparatory operations have finished, the shake detecting/computing section and the exposure start determining section start to operate. An exposure-start-determining-method changing section changes an exposure start determination method used in the exposure start determining means before and after a predetermined period elapses from the start of the shake detecting/computing section and the exposure start determining section.

24 Claims, 20 Drawing Sheets

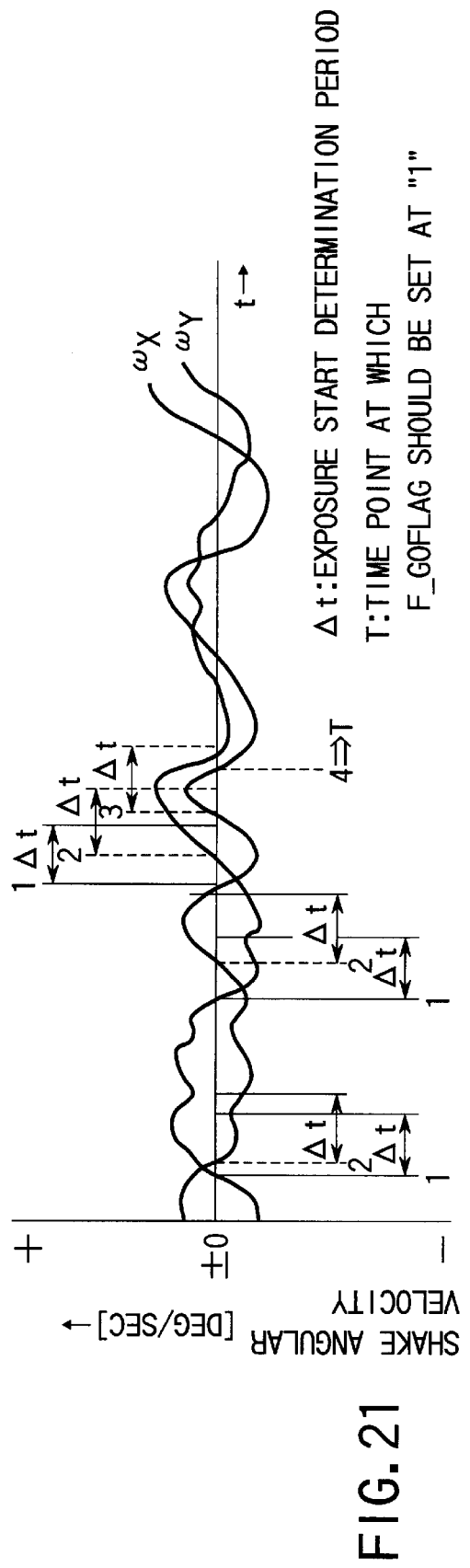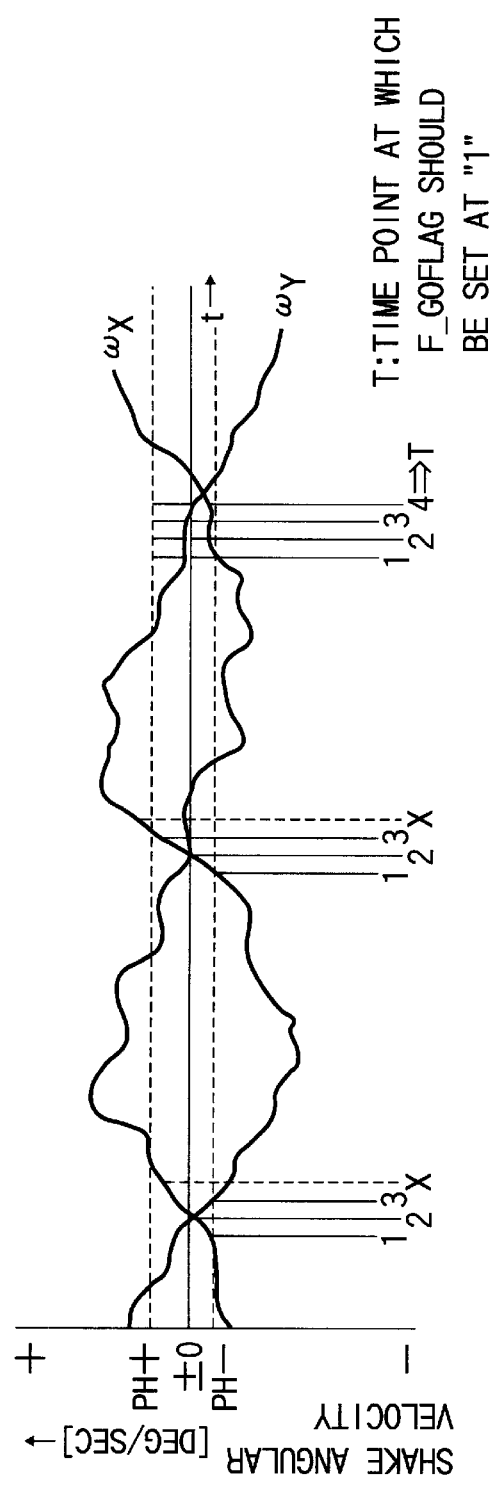
FIG. 21
FIG. 23

CAMERA WITH BLUR REDUCING FUNCTION

CROSS-REFERENCE TO RELATED APPLICATIONS

This application is based upon and claims the benefit of priority from the prior Japanese Patent Applications No. 11-118018, filed Apr. 26, 1999; No. 11-118020, filed Apr. 26, 1999; and No. 11-118022, filed Apr. 26, 1999, the entire contents of which are incorporated herein by reference.

BACKGROUND OF THE INVENTION

This invention relates to a camera with a blur reducing function, which can start a photographing operation (a film exposure operation in the case of a camera using a film, and an imaging operation in the case of a digital camera) at a time point at which the camera is not greatly shook by hand, and more particularly to a method for determining whether the photographing operation should be started.

There are, so far, lots of proposals for a camera with a blur reducing function, which is adapted to start its exposure operation at a time point at which the camera is not greatly shook by hand.

For example, U.S. Pat. No. 5,790,490 proposes an anti-shake camera wherein the level of hand-shake of the camera is detected, and exposure is started when it is determined that the level of shaking is lower than a predetermined value, i.e. that the shake level of the camera is sufficiently reduced, thereby preventing (reducing) blurring from occurring in a photograph.

The method disclosed in the above US Patent enables reduction in blurring in a photograph. If, however, a long time lag exists due to a mechanical operation of, for example, a shutter until exposure is actually executed after it is determined that the level of shaking reduces and hence that start of exposure is allowable, a high blur reducing effect cannot be obtained.

To avoid this, Japanese Patent Application KOKAI Publications Nos. 5-204012, 5-204013 and 5-204014, for example, disclose a technique for estimating hand-shaking, and determining on the basis of the estimation result whether exposure should be started, thereby enhancing the blur reducing effect.

However, to estimate the state of shaking that will occur after a predetermined period, data on the state of shaking at previous time points are necessary. Therefore, unless such data is accumulated for a predetermined period, shake estimation cannot be executed, and accordingly exposure start determination based on the estimation result cannot be executed. The period required for data accumulation is, for example, about several tens milliseconds, which leads to a long time lag for releasing the camera. It is highly possible that a small amount of shaking will occur during the time lag, and accordingly the photographer may miss the opportunity of starting exposure.

There is one type of photography that is executed while moving a camera. In this photography, shaking or movement inevitably occurs. Therefore, if the anti-shake camera as disclosed in the U.S. Pat. No. 5,790,490 is used for the above photography method, the operation of moving a camera is erroneously determined as shaking. As a result, exposure is hard to start, which may result in missing the best opportunity for photography.

This disadvantage can be eliminated by turning off the blur reducing function or mode. In order to turn off the mode, however, setting/operation for it alone must be done and it is troublesome.

Further, a problem of "shaking", which occurs in usual photography, exists in a direction differing from that of the movement of a camera during photography executed while moving the camera.

In the anti-shake camera disclosed in the US Patent, reduction of shaking is detected by determining whether or not both shake levels in two directions have crossed a level of zero (shake velocity is zero; a stationary state).

In this technique, exposure is basically started after the level of shaking reduces, and hence the release time lag may be longer than in the usual case. The release time lag greatly depends upon the aforementioned predetermined period. Specifically, if the predetermined period is set short, both the shake levels in two directions rarely cross the zero level, resulting in a long release time lag. On the other hand, if the predetermined period is set longer, it is highly possible that both the shake levels in two directions will cross the zero level, and hence that the start of exposure will be determined to be allowable. Accordingly, the release time lag will be short. In this case, however, it is also highly possible that the degree of blurring in an exposed photograph will be high.

In the system disclosed in the above-described US Patent, basically, if the shake level is continuously high, the shake level during exposure is also high. In light of this, if blurring occurs in a photograph even when exposure timing control is executed to reduce blurring, it is desirable that the release time lag be short.

Moreover, there is a method in which exposure start determination is performed at a time point at which the level of shaking is low, and this time point is determined using a predetermined threshold value instead of the zero level. Also in this case, the same problem as above will occur depending upon whether the threshold value is high or low.

BRIEF SUMMARY OF THE INVENTION

The present invention has been developed in light of the above problems and aims to provide a camera with a blur reducing function for detecting a time point at which the level of shaking is low, thereby starting exposure at this time point, the camera being capable of quickly executing exposure start determination without a long time lag and hence being easy to use.

It is another object of the invention to provide a highly usable camera with a blur reducing function, capable of, without a long shutter time lag, even executing photography while moving the camera so as to obtain a best opportunity for photography.

It is yet another object of the invention to provide a camera with a blur reducing function, in which exposure is allowed when the level of shaking is low, the camera being operable with a short release time lag.

According to a first aspect of the present invention, there is provided a camera with a blur reducing function, comprising:

shake detecting/computing means for detecting and computing a shake state of the camera;

exposure start determining means for executing exposure start determination to reduce shaking during exposure, on the basis of an output of the shake detecting/computing means;

exposure means for executing an exposure operation in accordance with a determination result of the exposure start determining means;

exposure-start-determining-method changing means for changing an exposure start determination method used in the exposure start determining means; and condition setting means for setting a condition used in the exposure-start-determining-method changing means for changing the exposure start determination method used in the exposure start determining means.

According to a second aspect of the present invention, there is provided a camera with a blur reducing function, comprising:

shake detecting/computing means for detecting and computing a shake state of the camera;

shake estimating means for storing an output of the shake detecting/computing means and estimating a level of shaking on the basis of the stored output;

shake information stored state monitoring means for monitoring a shake information stored state of the shake estimating means;

exposure start determining means for executing exposure start determination to reduce shaking during exposure, on the basis of an output of the shake detecting/computing means or an output of the shake estimating means;

exposure means for executing an exposure operation in accordance with a determination result of the exposure start determining means; and exposure-start-determining-method changing means for changing an exposure start determination method used in the exposure start determining means, on the basis of a monitoring result of the shake information stored state monitoring means.

According to a third aspect of the present invention, there is provided a camera with a blur reducing function, comprising:

a shake detecting section for sampling shake levels of the camera in a time series manner;

a computing section for receiving a predetermined number of shake data items sampled by the shake detecting section in the time series manner, and executing predetermined computation of the shake data items; and a photography start timing determining section for comparing latest shake data, output from the shake detecting section, with a first determination reference range, and comparing a computation result, when output from the computing section, with a second reference range different from the first reference range, thereby determining on the basis of comparison results whether or not photography should be started.

According to a fourth aspect of the present invention, there is provided a camera with a blur reducing function including a shake detecting section for repeatedly detecting a shake state of the camera, and in which a shake state of the camera is repeatedly detected in response to a releasing operation for instructing start of photography, and photography is started at a time point at which shaking is in a predetermined state, comprising:

a determination reference range setting section for setting first and second reference ranges which are different from each other;

a shake estimating section for estimating a shake state of the camera to be obtained after a predetermined period, on the basis of a predetermined number of shake data items detected by the shake detecting section; and a photography start timing determining section for comparing latest shake data, output from the shake detecting section, with a first determination reference range until estimation information is output form the shake estimating section, and comparing the estimation information with the second reference range when the estimation information is output, thereby determining on the basis of comparison results whether or not photography should be started.

According to a fifth aspect of the present invention, there is provided a camera with a blur reducing function, comprising:

a shake data sampling section, responsive to a releasing operation, for sampling, in a time series manner, a shake level in each of two directions perpendicular to a photography optical axis of the camera and intersecting each other;

a "photography-with-moving-camera" determining section for determining, on the basis of an output of the shake data sampling section, whether or not photography is being executed while moving the camera, and invalidating data which is included in the output of the shake data sampling section and concerns a direction in which the camera is moving; and a control section for starting photography when the output of the shake data sampling section satisfies a predetermined reference value, or when a predetermined period has elapsed after the releasing operation.

According to a sixth aspect of the present invention, there is provided a camera for detecting levels of shaking in a plurality of directions in response to a releasing operation, and starting photography at a time point at which shaking is at a low level, comprising:

a shake level detecting, responsive to a releasing operation, for detecting levels of shaking in a plurality of directions; and a control section for determining, on the basis of levels of shaking in the plurality of directions detected by the shake level detecting section, whether or not photography is being executed while moving the camera, the control section invalidating a shake state signal obtained in a direction in which photography is being executed while moving the camera.

According to a seventh aspect of the present invention, there is provided a camera with a blur reducing function, comprising:

a time measuring section, responsive to a releasing operation, for starting to measure a time period and stop it when a predetermined time limit expires;

a shake detecting section for repeatedly detecting a shake level of the camera; and a photography start timing determining section for starting photography, when the predetermined time limit has expired or while time measurement is executed before the predetermined time limit expires, in accordance with a comparison result between a predetermined reference range and an estimated level of shaking which is obtained, after a predetermined period, on the basis of a plurality of shake data items including the detected shake level and shake levels near the detected shake level, wherein the photography start timing determining section increases the predetermined period each time comparison has been executed.

According to a eighth aspect of the present invention, there is provided a camera with a blur reducing function, comprising:

a time measuring section, responsive to a releasing operation, for starting to measure a time period and stop it when a predetermined time limit expires;

a shake detecting section for repeatedly detecting a shake level of the camera; and a photography start timing determining section for starting photography, when the predetermined time limit has expired or while time measurement is executed before the predetermined time limit expires, in accordance with a comparison result between a predetermined reference range and an estimated level of shaking which is obtained, after a predetermined period, on the basis of a plurality of shake data items including the detected shake level and shake levels near the detected shake level, wherein the photography start timing determining section widens the predetermined reference range each time comparison is executed.

According to a ninth aspect of the present invention, there is provided a method of reducing blurring in a photograph taken by a camera which has a sensor for detecting a shake state of the camera and can reduce shaking during exposure, comprising:

a first step of sampling levels of shaking in a time series manner on the basis of an output of the sensor;

a second step of receiving a predetermined number of shake data items sampled in the time series manner, thereby executing predetermined computation of the shake data items;

a third step of comparing latest shake data, output from the sensor, with a first determination reference range;

a fourth step of comparing a computation result, when output at the second step, with a second determination reference range different from the first determination reference range; and a fifth step of determining, on the basis of a comparison result at the third step or the fourth step, whether or not exposure should be started.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 21 is a graph illustrating the relationship between the time and the X- and Y-directional shake angular velocities, and useful in explaining the exposure start determination operation A in FIG. 20;

FIG. 23 is a graph illustrating the relationship between the time and the X- and Y-directional shake angular velocities, and useful in explaining the exposure start determination operation A in FIG. 22.

DETAILED DESCRIPTION OF THE INVENTION

Before describing the embodiments of the invention, the basic concept of the invention will be described.

Figure 1:
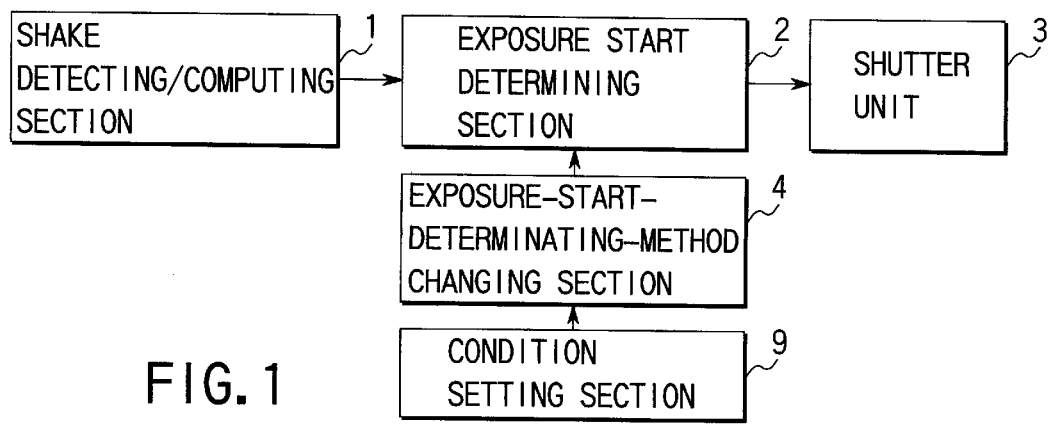
FIG. 1 is a block diagram illustrating the concept of a camera with a blur reducing function according to the invention.

FIG. 1 is a block diagram illustrating the concept of a camera with a blur reducing function according to the invention. The camera shown in FIG. 1 is a camera using a film.

A shake detecting/computing section 1 executes detection and computation of hand-shake levels. Actually, the shake detecting/computing section 1 includes a pair of shake detecting/computing elements corresponding to the X-axis and the Y-axis of a photography screen. An exposure start determining section 2 determines whether the present level of shaking is high or low, on the basis of the output (i.e. the level of hand-shake) of the shake detecting/computing section 1, thereby allowing the start of exposure when the level of shaking is low. A shutter unit 3 operates and executes exposure in accordance with a determination result obtained from the exposure start determining section 2. An exposure-start-determining-method changing section 4 changes an exposure start determination method employed in the exposure start determining section 2. A condition setting section 9 sets a changing condition, which is used in the exposure-start-determining-method changing section 4, for changing the exposure start determination method employed in the exposure start determining section 2.

The operation of the camera with the blur reducing function constructed as above will be described briefly. Basically, the exposure start determining section 2 executes exposure start determination for reducing blurring on the basis of the output of the shake detecting/computing section 1. At this time, the exposure start determination method employed in the exposure start determining section 2 is changed in accordance with a changing condition set by the condition setting section 9. Various types of changing conditions are considered and will be specifically described with reference to the embodiments of the invention.

The embodiments of the invention will now be described with reference to drawings.

Figure 2:
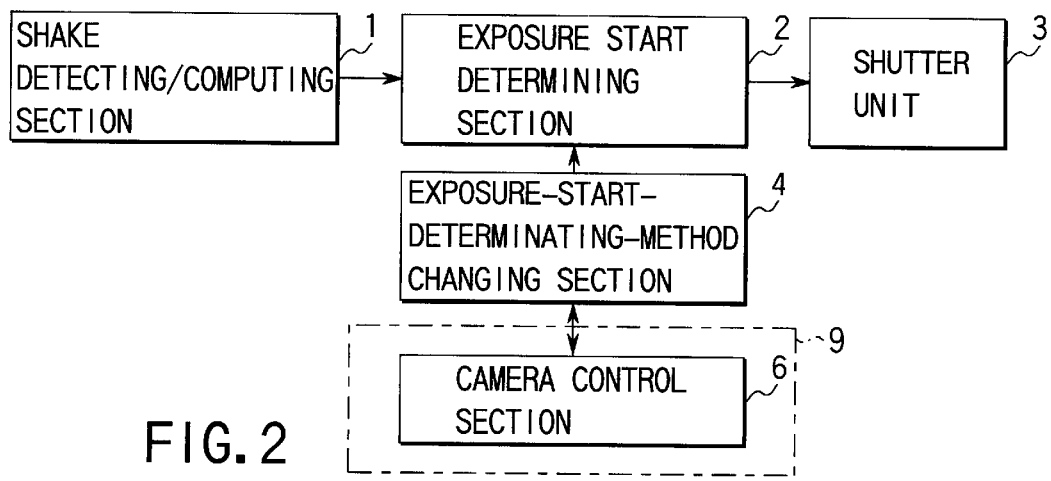
FIG. 2 is a block diagram illustrating the concept of a camera with a blur reducing function according to a first embodiment of the invention.

FIG. 2 is a block diagram illustrating the concept of a camera with a blur reducing function according to a first embodiment of the invention. This embodiment employs a camera using a film as an example.

In the camera with the blur reducing function according to the first embodiment, the condition setting section 9 is constituted of a camera control section 6 for controlling all operations of the camera.

Specifically, in the camera with the blur reducing function according to the first embodiment, the exposure start determining section 2 executes exposure start determination for blur reduction on the basis of the output of the shake detecting/computing section 1. At this time, in accordance with the operation state of the camera, the exposure start determination method used in the exposure start determining section 2 is changed. More specifically, preparatory operations (a mirror raising operation, a lens stop down operation, etc.) for exposure are executed in accordance with an exposure start instructing operation (a releasing operation). After the completion of these preparatory operations, the shake detecting/computing section 1 and the exposure start determining section 2 are started to operate. The exposure-start-determining-method changing section 4 changes the exposure start determination method in the exposure start determining section 2 before and after a predetermined period elapses from the start of each section.

Figure 3:
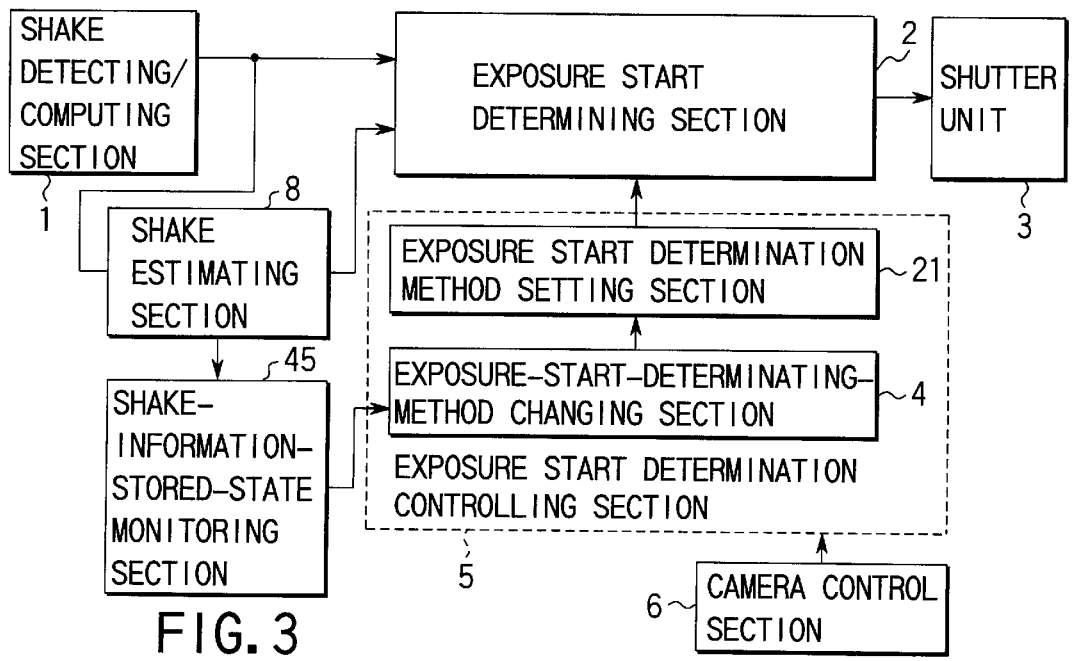
FIG. 3 is a block diagram illustrating the structure of FIG. 2 in more detail.

FIG. 3 is a block diagram illustrating the structure of FIG. 2 in more detail.

In FIG. 3, a shake estimating section 8 stores the output of the shake detecting/computing section 1 and executes estimation of shaking on the basis of the stored data. A shake-information-stored-state monitoring section 45 monitors (checks) a shake information started state in the shake estimating section 8. The exposure-start-determining-method changing section 4 is incorporated in an exposure start determination controlling section 5. An exposure start method setting section 21 is provided between the exposure-start-determining-method changing section 4 and the exposure start determining section 2.

The operation of the structure shown in FIG. 3 will be described briefly. Basically, the exposure start determining section 2 executes exposure start determination for reducing blurring on the basis of the output of the shake detecting/computing section 1. At this time, the shake-information-stored-state monitoring section 45 monitors (checks) the shake information stored state of the shake estimating section 8, and sends the monitoring result to the exposure-start-determining-method changing section 4. Upon receiving the monitoring result, the exposure-start-determining-method changing section 4 changes the exposure start determination method used in the exposure start determining section 2. Specifically, preparatory operations (a mirror raising operation, a lens stop down operation, etc.) for exposure are executed in accordance with an exposure start instructing operation (a releasing operation). After the completion of these preparatory operations, the shake detecting/computing section 1, the shake estimating section 8 and the exposure start determining section 2 are started to operate. At this time, the shake-information-stored-state monitoring section 45 monitors whether or not a predetermined number (corresponding to a predetermined period) of shake levels are accumulated in the shake estimating section 8, thereby changing the exposure start determination method in the exposure start determining section 2 before and after the predetermined number is reached. In other words, the exposure start determining section 2 executes exposure start determination on the basis of the output of the shake detecting/computing section 1 until the predetermined number is reached, and executes the determination on the basis of the output of the shake estimating section 8 after the predetermined number is reached.

Figure 4:
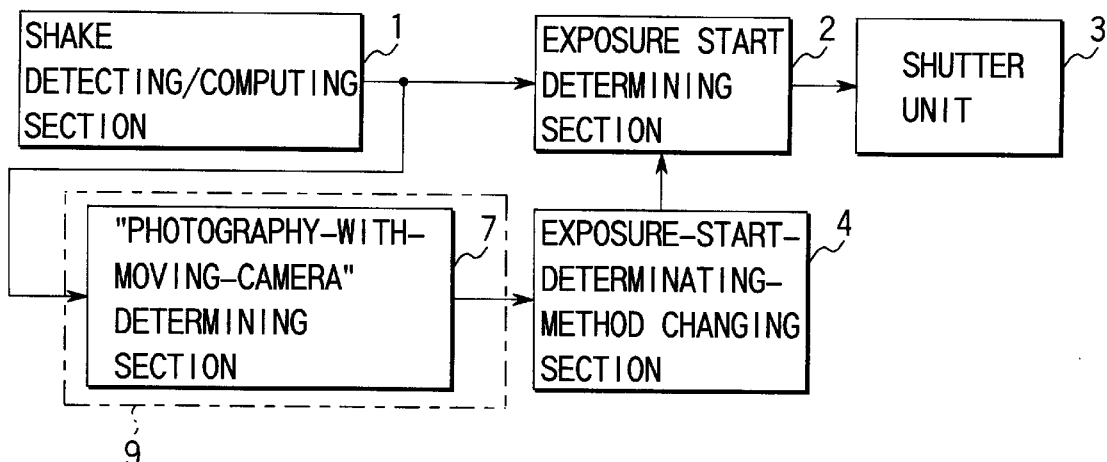
FIG. 4 is a block diagram illustrating the concept of a camera with a blur reducing function according to a second embodiment of the invention.

The second embodiment of the invention will be described. FIG. 4 is a block diagram illustrating the concept of a camera with a blur reducing function according to the second embodiment of the invention. This embodiment employs a camera using a film.

In the camera with the blur reducing function of the second embodiment, the condition setting section 9 is formed as a "photography-with-moving-camera" determining section 7 which determines, from the output of the shake detecting/computing section 1, i.e. from a shake level signal, whether or not photography is being executed while moving the camera.

In this type of camera, the exposure start determining section 2 executes exposure start determination on the basis of the output of the shake detecting/computing section 1, and a reduction in the level of shaking is waited for. In parallel with this operation, the "photography-with-moving-camera" determining section 7 determines, from the output of the shake detecting/computing section 1, whether or not photography is being executed while moving the camera. If it is determined that photography is being executed while moving the camera, the determination method used in the exposure start determining section 2 is changed. As a result, the exposure start determining section 2 executes exposure start determination only on the basis of an output obtained in a direction of shaking that is irrelevant to "photography-with-moving-camera". This results in minimization of a time lag which is not necessary for "photography-with-moving-camera", while reducing blurring in a resultant photograph.

Figure 5:
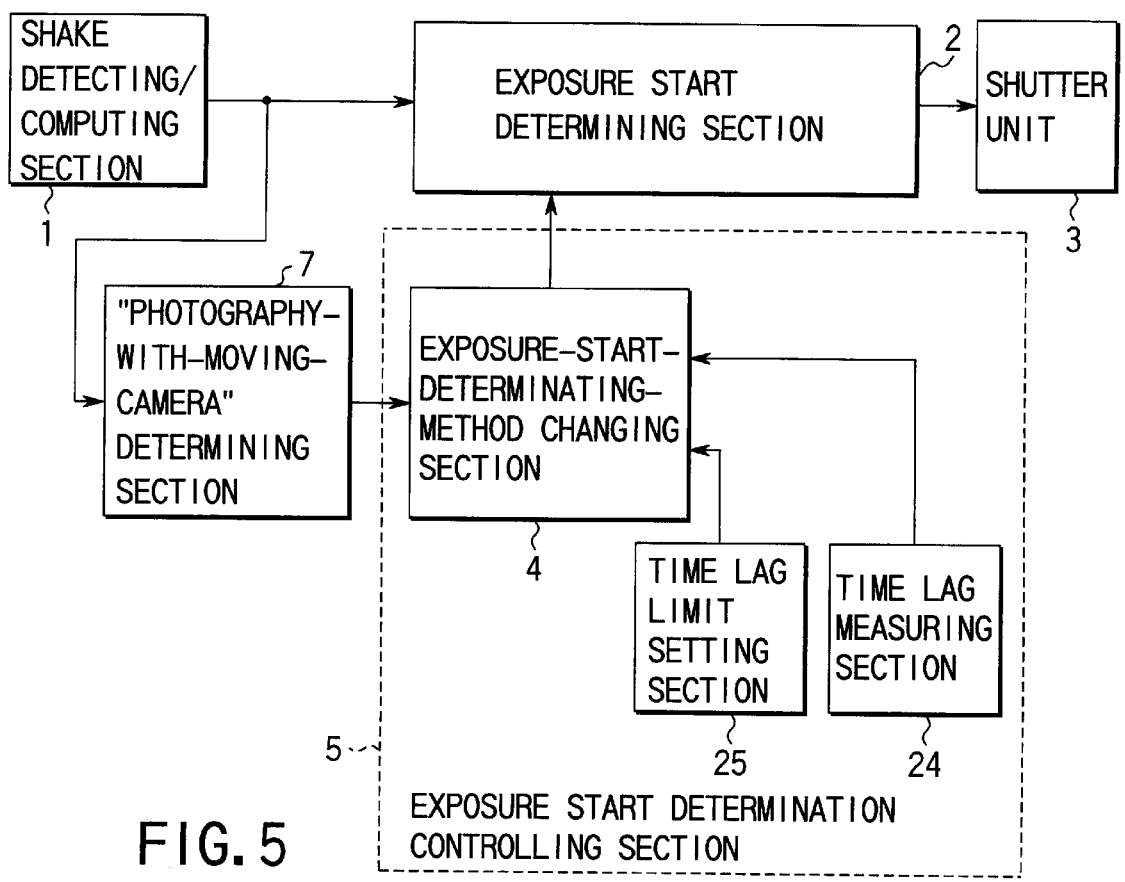
FIG. 5 is a block diagram illustrating the structure of FIG. 4 in more detail.

FIG. 5 is a block diagram illustrating the structure of FIG. 4 in more detail.

Specifically, the exposure-start-determining-method changing section 4 is incorporated in the exposure start determination controlling section 5. The exposure start determination controlling section 5 also includes a time lag measuring section 24 and a time lag limit setting section 25.

The operation of the structure shown in FIG. 5 will be described briefly. When the "photography-with-moving-camera" determining section 7 has determined that photography is being executed while moving the camera, it is considered that the shutter operation can be more easily allowed than in the case of usual photography, and hence a period for exposure determination control in the exposure start determining section 2 is set short so as to shorten the time lag as much as possible. Specifically, a short period is set in the time lag limit setting section 25, and the set period is compared with a period which is being measured by the time lag measuring section 24. If the measured period reaches the set period, the exposure start determination executed by the exposure start determining section 2 is finished, and an exposure operation is executed by the shutter unit 3.

Figure 6:
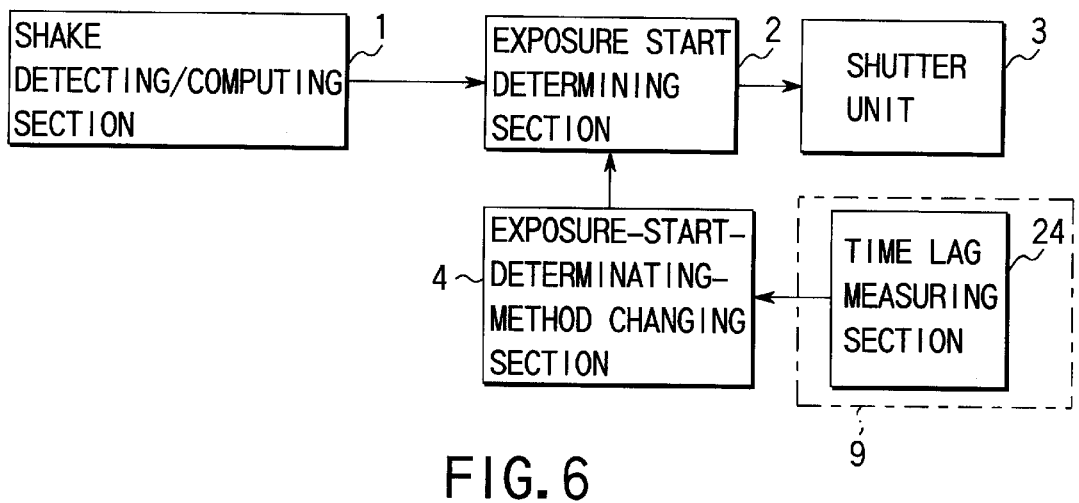
FIG. 6 is a block diagram illustrating the concept of a camera with a blur reducing function according to a third embodiment of the invention.

A third embodiment of the invention will be described. FIG. 6 is a block diagram illustrating the concept of a camera with a blur reducing function according to the third embodiment of the invention. This embodiment employs a camera using a film as an example.

In the camera with the blur reducing function according to the third embodiment, the condition setting section 9 is constituted of the time lag measuring section 24 for measuring a period (a time lag) which has elapsed after exposure start determination is executed by the exposure start determining section 2 for starting the operation of the shutter unit 3.

In this type of camera, the exposure start determining section 2 executes exposure start determination on the basis of the output of the shake detecting/computing section 1, and a reduction in the level of shaking is waited for. The exposure-start-determining-method changing section 4 determines the wait period, i.e. the time lag, and changes the determination method used in the exposure start determining section 2. As a result, the resultant time lag is shortened, while shake reduction is executed.

Figure 7:
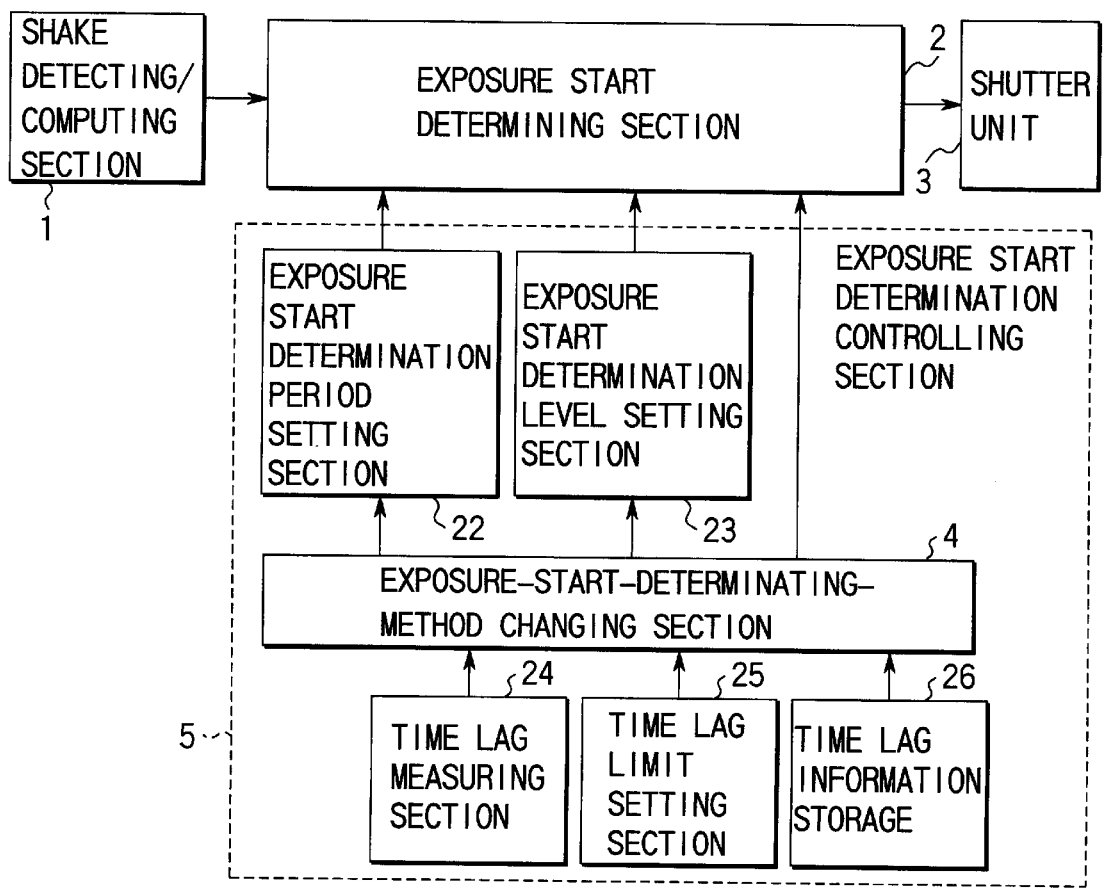
FIG. 7 is a block diagram illustrating the structure of FIG. 6 in more detail.

FIG. 7 is a block diagram illustrating the structure of FIG. 6 in more detail.

The exposure-start-determining-method changing section 4 is incorporated in the exposure start determination controlling section 5. The exposure start determination controlling section 5 also includes an exposure start determination period setting section 22, an exposure start determination level setting section 23, the time lag measuring section 24, the time lag limit setting section 25, and a time lag information storage 26.

The operation of the structure shown in FIG. 7 will be described briefly. The exposure-start-determining-method changing section 4 compares time information stored in the time lag information storage 26 with the measurement result of the time lag measuring section 24. Further, the exposure-start-determining-method changing section 4 changes the exposure start determination method used in the exposure start determining section 2, in accordance with the lapse of time. More specifically, the changing section 4 changes shake allowable period information, which is set in the exposure start determination period setting section 22 and concerns the shake level output from the shake detecting/ computing section 1, and determination level information, which is set in the exposure start determination level setting section 23 and concerns the shake level output from the shake detecting/computing section 1. This structure can provide an advantage as described above with reference to FIG. 6.

Figure 8:
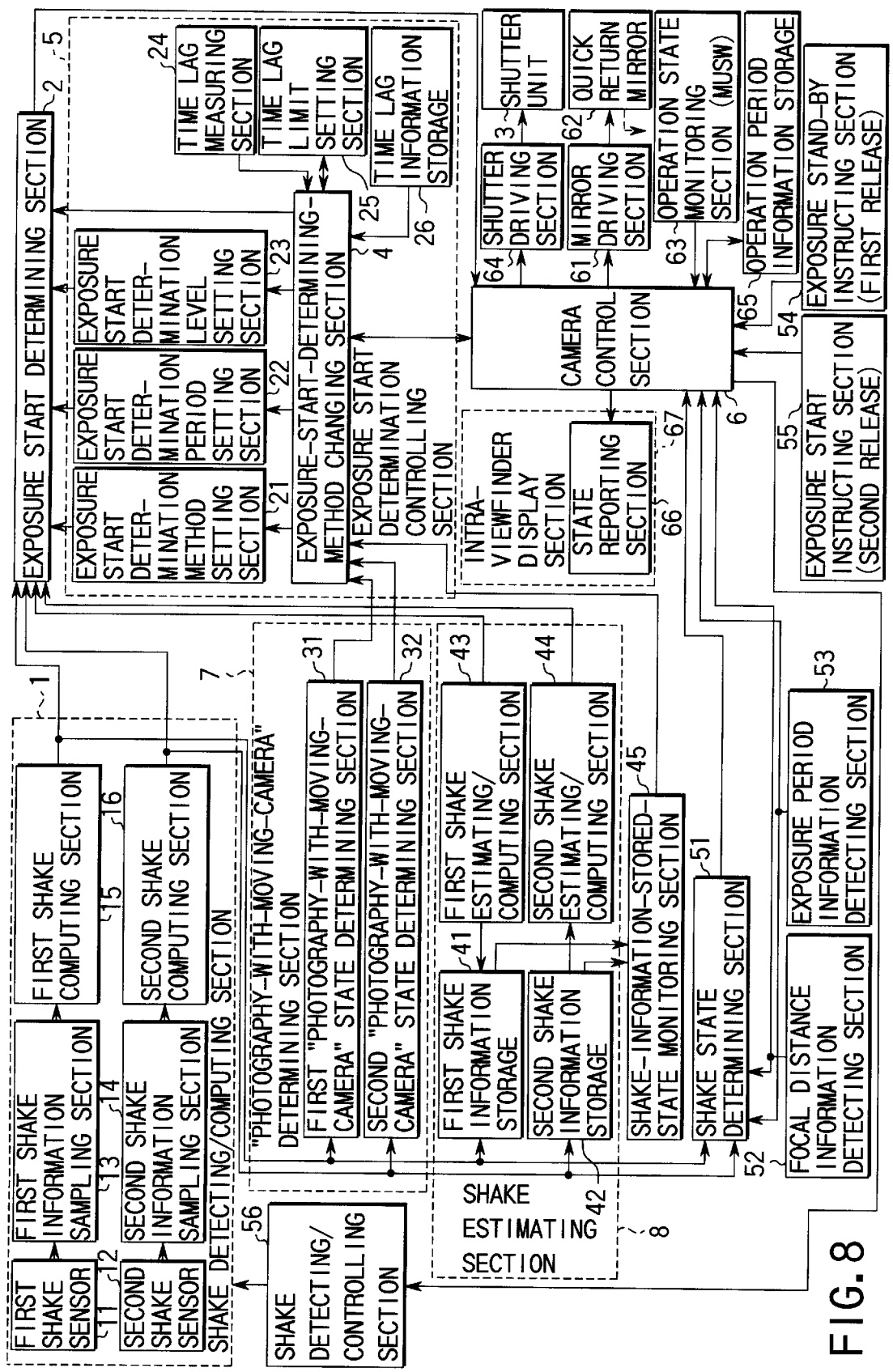
FIG. 8 is a block diagram illustrating an essential part of a single-lens reflex camera to which the camera with the blur reducing function according to each of the first to third embodiments of the invention is applied.

FIG. 8 is a block diagram illustrating an essential part of a single-lens reflex camera to which the camera with the blur reducing function according to each of the first to third embodiments of the invention is applied.

The shake detecting/computing section 1 includes a first shake sensor 11, a second shake sensor 12, a first shake information sampling section 13, a second shake information sampling section 14, a first shake computing section 15 and a second shake computing section 16. The words "first" and "second" correspond to the X-axis and the Y-axis, respectively.

The first and second shake sensors 11 and 12 are formed of, for example, a known oscillation gyroscope (an angular velocity sensor). The first and second shake information sampling sections 13 and 14 are formed of an A/D conversion input port incorporated in a CPU. Further, each element located downstream of the first and second shake information sampling sections 13 and 14, which will be described later, is realized by the CPU, except for a storage formed of, for example, an EEPROM.

The first and second shake computing sections 15 and 16 execute, for example, a filtering operation on sampled data concerning shaking for eliminating any unnecessary frequency component. The outputs of the two shake computing sections 15 and 16 are sent to the exposure start determining section 2, a "photography-with-moving-camera" determining section 7 for determining whether or not photography is being executed while moving the camera, a shake estimating section 8 and a shake state determining section 51.

Figure 9:
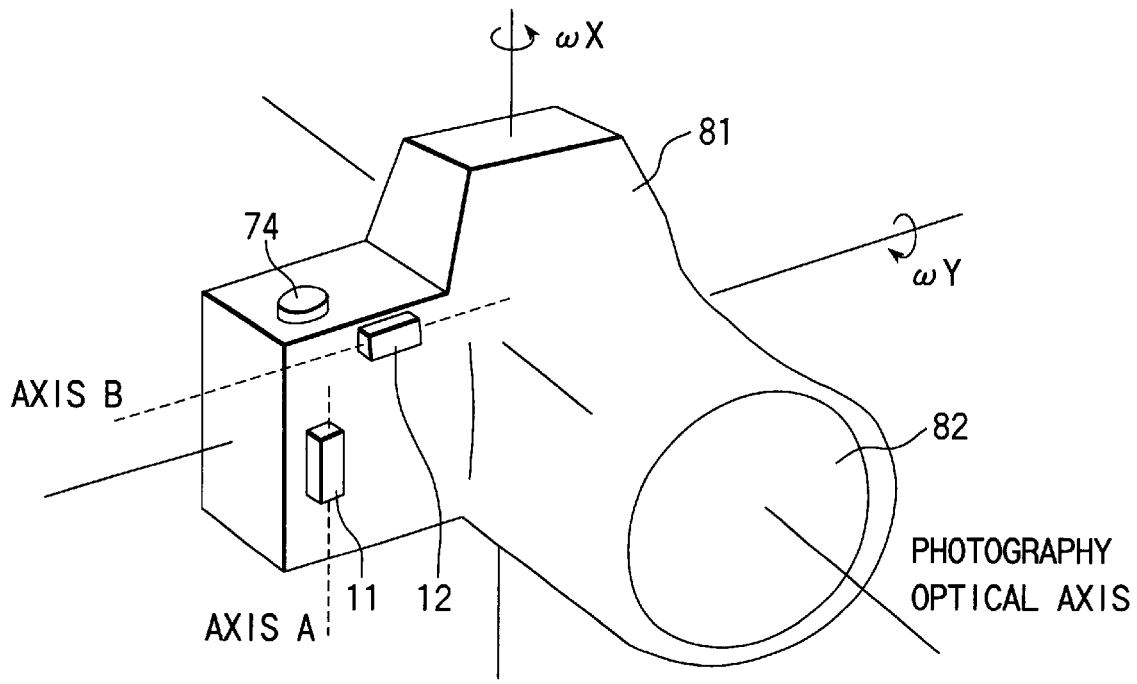
FIG. 9 is a perspective view useful in explaining the mounting positions of first and second shake sensors on a camera body.

The first and second shake sensors 11 and 12 are provided in a camera body 81 as shown in FIG. 9. In FIG. 9, reference numeral 74 denotes a release button, and reference numeral 82 denotes a lens.

The "photography-with-moving-camera" determining section 7 determines whether or not photography is being executed while moving the camera, on the basis of the output of the shake detecting/computing section 1, and includes a first "photography-with-moving-camera" state determining section 31 and a second "photography-with-moving-camera" state determining section 32. The words "first" and "second" correspond to the X-axis and the Y-axis, respectively. The determination results of the sections 31 and 32 are sent to an exposure-start-determining-method changing section 4.

The shake estimating section 8 estimates the state of shaking on the basis of the output of the shake detecting/ computing section 1. The section 8 includes a first shake information storage 41, a second shake information storage 42, a first shake estimating/computing section 43 and a second shake estimating/computing section 44. The words "first" and "second" correspond to the X-axis and the Y-axis, respectively. The first and second shake information storages 41 and 42 store past data concerning the state of shaking, which is used for operations in the first and second shake estimating/computing sections 43 and 44. The first and second shake estimating/computing sections 43 and 44 estimate the levels of shaking at a time point slightly after the present time point by operations based on present/past shake level data stored in the first and second shake information storages 41 and 42, respectively. Specifically, the shake estimating operation is executed by a method as disclosed in Japanese Patent Application KOKAI Publication No. 5-204012. This method will be described briefly. The following formula is used for the estimating operation:

$$BL(t+m)=Ka*BL(t)+Kb*BL(t-10)+Kc*BL(t-20)$$

where BL(t+m) represents the level of shaking at a time point m[mSEC] after the present time point, BL(t) the level of shaking at the present time point, BL(t−10) the level of shaking at a time point 10[mSEC] before the present time point, and BL(t−20) the level of shaking at a time point 20[mSEC] before the present time point. Ka, Kb and Kc represent coefficients for the estimating operation. From this operation, the level of shaking slightly after the present time point can be estimated on the basis of shake information concerning the present time point and the two earlier time points. The formula and the coefficients are common between the X-axis and the Y-axis.

The thus-obtained estimation results are sent to the exposure start determining section 2. A shake-information-stored-state monitoring section 45 checks whether the first and second shake information storages 41 and 42 each store a predetermined number (corresponding to a predetermined period) of shake level data items. The checking results are sent to the exposure-start-determining-method changing section 4, where the results are used as a basis for changing the exposure start determining method employed in the exposure start determining section 2.

The shake state determining section 51 calculates the present level of blurring in an image on the basis of shake level data from the shake detecting/computing section 1, focal distance information from a focal distance information detecting section 52, and exposure period information from an exposure period information detecting section 53. The calculation result is sent to the camera control section 6, and a state reporting section 66 incorporated in an intra-viewfinder display section 67 informs (displays) the present level of shaking.

The camera control section 6 controls the entire camera. FIG. 8 shows only elements relating to the present invention and none of the other elements.

The outputs of an exposure stand-by instructing section 54 (a first release) and an exposure start instructing section 55 (a second release) are input to the camera control section 6. When the two-stage release button 74 has been half depressed, the exposure stand-by instructing section 54 generates a first release signal. Upon receiving the first release signal, the camera control section 6 executes known photography preparation operations such as AE and AF operations, a lens protruding operation, etc. Simultaneously, the camera control section 6 supplies an instruction to the shake detecting/controlling section 56 to drive the shake detecting/computing section 1 in order to inform the level of generated shaking.

When the release button 74 has been wholly depressed, the exposure start instructing section 55 generates a second release signal. Upon receiving the second release signal, the camera control section 6 executes an operation for exposure. Specifically, in the case of a single-lens reflex camera, the mirror driving section 61 drives the quick return mirror 62 so that light guided thereto from the lens 82 can reach an imaging surface (film). The operation state monitoring section 63 is means for monitoring the operation state of the quick return mirror 62. In addition, a lens stop (not shown) is driven to a required stop value. When the mirror 62 and the lens stop have been shifted to respective predetermined states, a shutter driving section 64 drives the shutter unit 3.

After a predetermined exposure period passes, exposure is finished, whereby the mirror 26 and the lens stop are returned to predetermined positions, and the film is wound. This is the termination of a series of exposure operations.

In the camera of this embodiment, the blur reducing function is executed at this time. Specifically, detection of shaking is started when the mirror has stopped its operation, thereby monitoring the level of shaking. If it is determined, using a predetermined algorithm, that the level of shaking has reduced, the shutter unit 3 is allowed to operate. The above-described series of operations will be referred to as "exposure start timing control". When the raising operation of the mirror 62 is completed, the camera shakes. If, at this time, the shake detection result is used without any correction, it is possible that the aforementioned shake estimating operation result will be adversely affected. This leads to reduction of the blur reducing effect. To avoid it, it is necessary to consider the timing for starting the shake detecting operation. The operation period information storage 65 stores information concerning this timing. The period information may consist of fixed values, and may be stored in a memory such as an EEPROM.

The above-mentioned exposure start timing control is executed by the exposure start determining section 2 and an exposure start determination controlling section 5. The exposure start determination controlling section 5 includes the exposure-start-determining-method changing section 4, as well as an exposure start determination method setting section 21, an exposure start determination period setting section 22 and an exposure start determination level setting section 23. The exposure start determining section 2 executes an exposure start determination basically on the basis of parameters set in these setting sections 21, 22 and 23.

Specifically, an algorithm (which will be described later in detail) for exposure start determination is set in the exposure start determination method setting section 21. Information concerning exposure start determination periods for the X-axis and the Y-axis included in the parameters for the exposure start determination is stored in the exposure start determination period setting section 22. If the determination period is set long, the frequency of generation of an exposure start allowing signal is high, whereas if the period is set short, the frequency is low. Information concerning a determination level (threshold) for determining the level of shaking, which is included in the parameters for the exposure start determination, is set in the exposure start determination level setting section 23. If the determination level is set high, the frequency of generation of the exposure start allowing signal is high, whereas if the level is set low, the frequency is low. These information items are set at required values.

In the exposure start timing control, it is basically considered that exposure is started when the level of shaking has become low. In this case, however, exposure cannot be started unless the shaking level becomes low. Accordingly, there may be a case where exposure can never be started, and the photographer misunderstands that the camera is erroneously operating. To avoid this, the exposure start timing control is generally stopped, irrespective of the shaking level, after a predetermined period elapses. Moreover, it is considered to execute the exposure start timing control so as to output the exposure start allowing signal before the above-described predetermined period has been reached, i.e. so as to shorten a delay period (a release time lag). Specifically, the parameter set in the exposure start determination period setting section 22 or the exposure start determination level setting section 23, and used in the exposure start determining section 2, is changed in accordance with a period having elapsed from the start of the exposure start timing control. Furthermore, the photographer can be warned by being informed, through the state reporting section 66 of the intra-viewfinder display section 67, of the fact that the exposure timing control is being executed for more than a predetermined period (this means that the level of shaking is not low).

To execute the above operations, the exposure start determination controlling section 5 also contains a time lag measuring section 24, a time lag limit setting section 25 and a time lag information storage 26. The time lag measuring section 24 measures a period for which the exposure start timing control is executed, i.e. a time lag which has occurred. The time lag limit setting section 25 sets information on a predetermined time at which the exposure start timing control should be finished. The time lag information storage 26 stores a predetermined period shorter than a time lag limit, which is used as a basis for changing information set in, for example, the exposure start determination period setting section 22 in accordance with the exposure start timing control period, or a basis for the informing operation of the state reporting section 66. The time lag measuring section 24, the time lag limit setting section 25 and the time lag information storage 26 are connected to the exposure-start-determining-method changing section 4. In the section 4, determination concerning time is executed.

Figure 10:
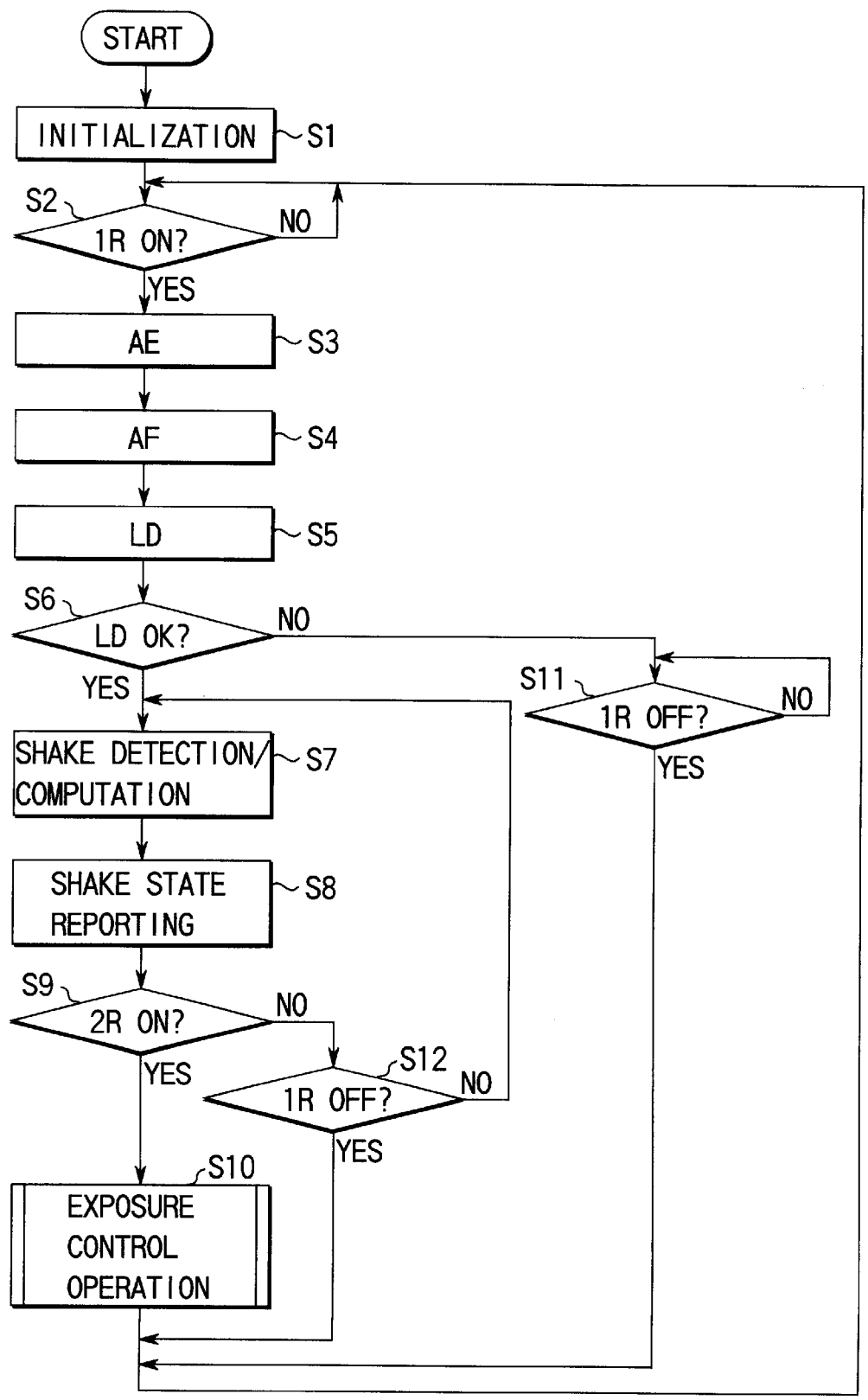
FIG. 10 is a flowchart useful in explaining the operation of the camera of FIG. 8.

FIG. 10 is a flowchart useful in explaining the camera constructed as above.

When a battery has been mounted in the camera or the power switch (not shown) of the camera has been turned on, and the camera has stated operating, the camera is first initialized (step S1), and is then shifted to a state in which it waits for the turn-on of a first release signal (1R) by the exposure stand-by instructing section 54 (step S2).

When the 1R has been turned on, the exposure period information detecting section 53 executes photometry (AE) (step S3) and the focal distance information detecting section 52 executes ranging (AF) (step S4). In accordance with focal distance information obtained by the AF, the lens 82 is driven (lens drive (LD))(step S5). It is determined at a step S6 whether the LD operation is executed appropriately (i.e. the LD operation is OK). If the LD operation is not OK, turn-off of the 1R is waited for (step S11), thereby returning to the step S2.

On the other hand, if the LD operation is determined to be OK, the shake detecting/computing section 1 executes detection and computation of shaking (step S7). Upon receiving the detecting/computing result, the shake state determining section 51 calculates the level of shaking, whereby the state reporting section 66 reports the calculated shake level (step S8).

Figure 11:
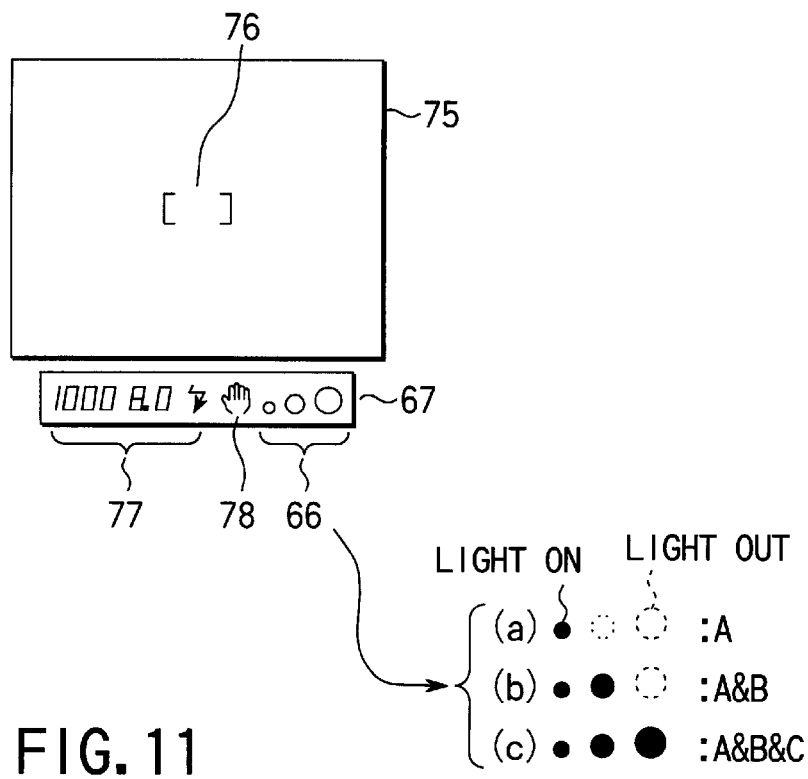
FIG. 11 is a view showing a display example of information on a shaking level.

Referring then to FIG. 11, a display example of the shaking level will be described. AS shown, the intra-viewfinder display section 67 is provided below a viewfinder field frame 75 equipped with a guide 76 for indicating a ranging point. The intra-viewfinder display section 67 includes, as well as the state reporting section 66, a photography information display section 77 for displaying an exposure period, a stop value, etc., and a blur reducing mode display section 78 for displaying whether or not a blur reducing mode is set by blur reducing mode setting means (not shown). Means that can display the level of shaking in three stages may be used as the state reporting section 66. In this case, a lighting display denoted by (a) indicates shaking of a low level, a lighting display denoted by (b) indicates shaking of an intermediate level, and a lighting display denoted by (c) indicates shaking of a high level.

After informing the state of shaking as above, it is determined at a step S9 whether or not the exposure start instructing section 55 has turned on a second release signal (2R). If the 2R is in the OFF state, it is determined at a step S12 whether or not the 1R is in the OFF state. If the 1R is determined to be in the ON state, the program returns to the step S7, thereby repeating the shake detecting/computing processing and the shake informing processing. If, on the other hand, the 1R is determined to be in the OFF state, the program returns to the step S2.

If the 2R is turned on, exposure control operation as described later is performed (step S10). After finishing the exposure control operation, the program returns to the step S2.

Figure 12A:
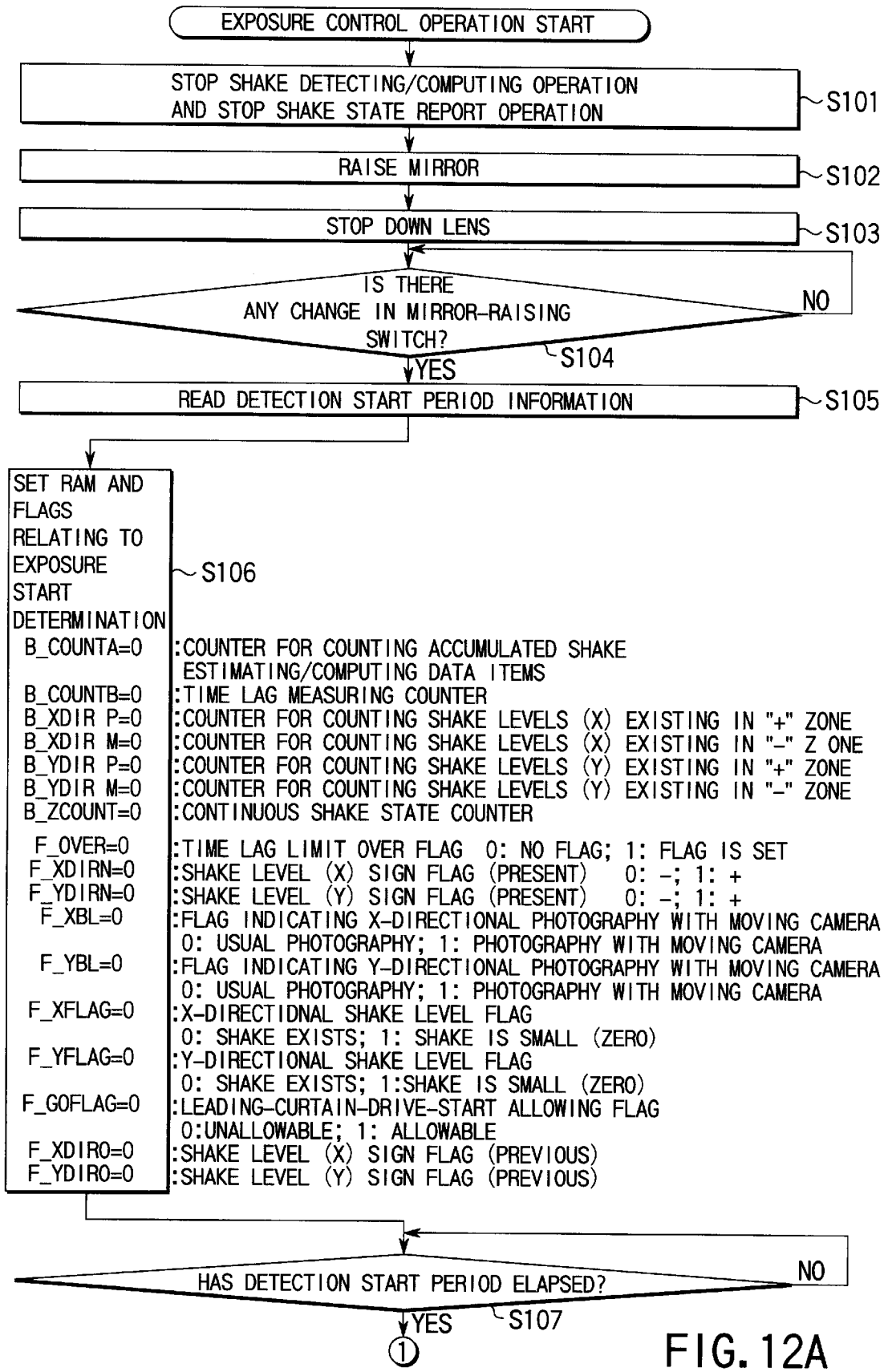
FIGS. 12A–12C are a series of flowcharts useful in explaining the exposure control operation in FIG. 10.
Figure 12B:
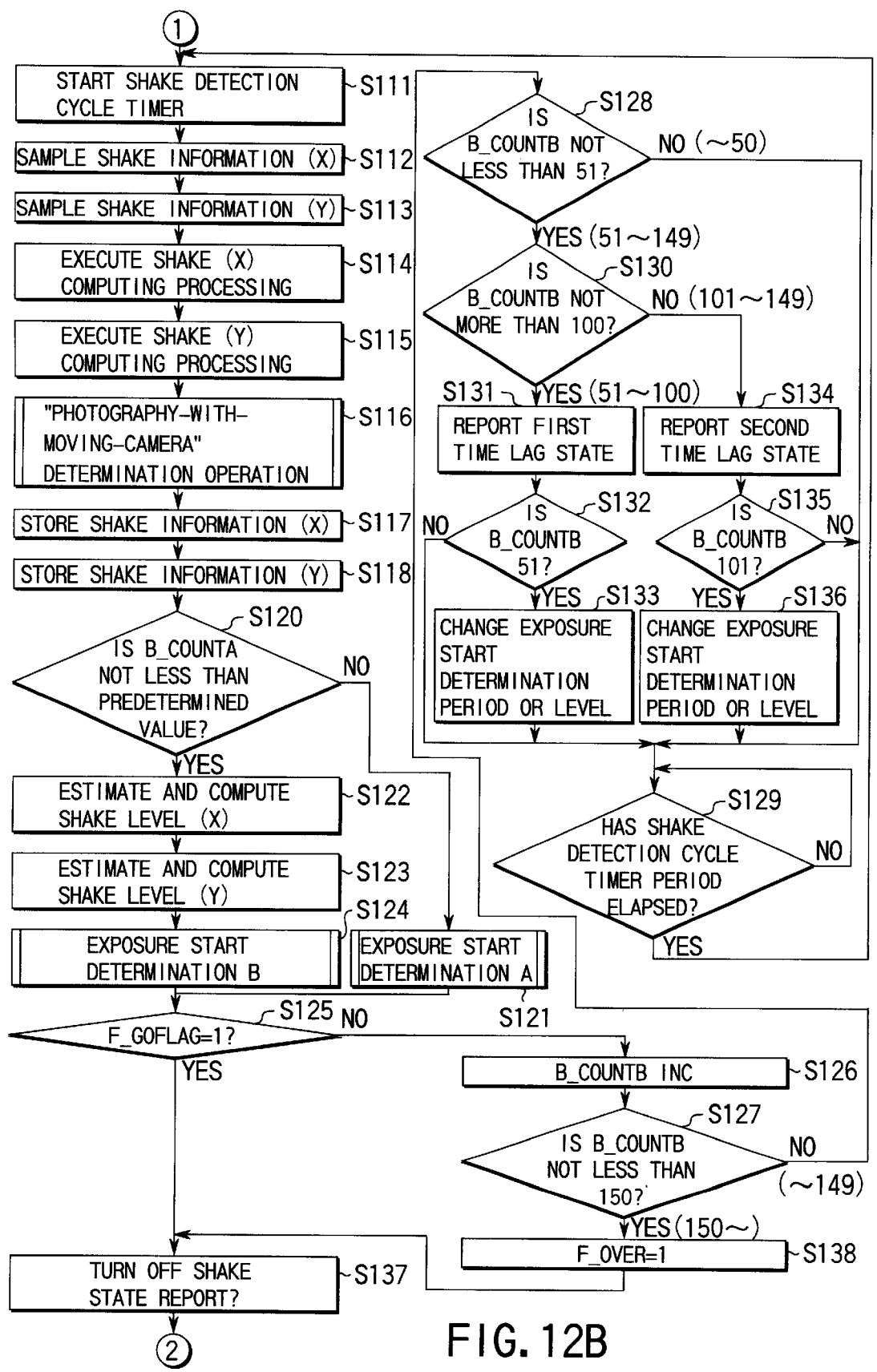
Figure 12C:
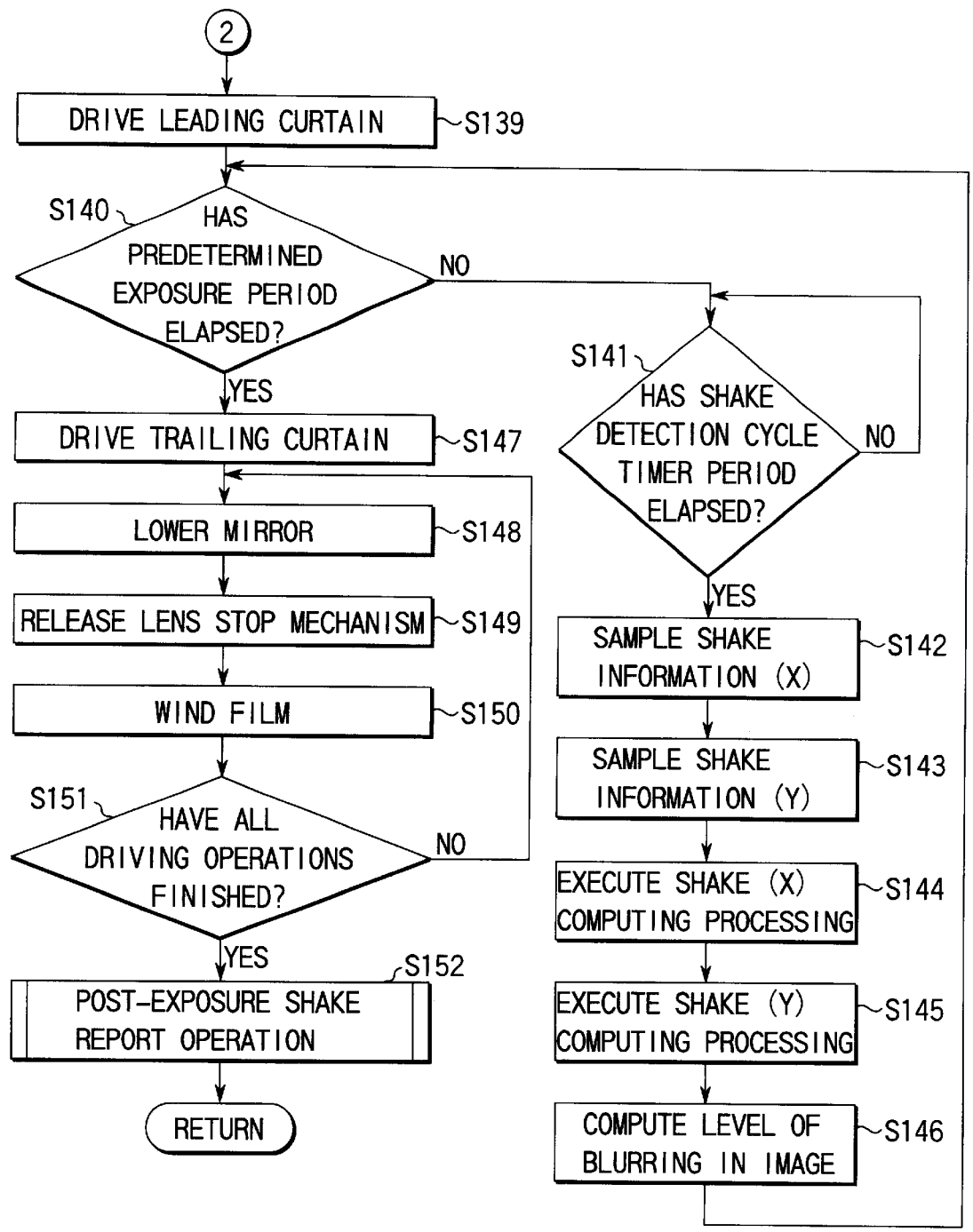

The "exposure control" operation at the step S10 is specifically carried out as indicated by a series of flowcharts of FIGS. 12A–12C.

First, the shake detecting/computing processing by the shake detecting/computing section 1 and the shaking-state informing processing by the state reporting section 66 are stopped simultaneously (step S101). Then, the quick return mirror 62 is raised by the mirror driving section 61 (step S102), and a lens stop mechanism (not shown) is driven to stop down the lens (step S103).

Subsequently, it is determined whether or not the state of the mirror-raising switch has changed (step S104). This determination is made on the basis of information output from the operation state monitoring section 63, and repeated until the state of the switch changes.

If there is a change in the state of the mirror-raising switch, timing information for starting the shake detecting processing is read from the operation period information storage 65 (step S105).

After that, RAM (counters) and flags (concerning the meanings of each counter and flag, see FIG. 12A), which are used in relation to exposure timing control described below, are cleared (initialized) (step S106).

It is determined at a step S107 whether or not a period equal to the period read at the step S105 has elapsed. This determination is repeated until the period elapses.

Figure 13:
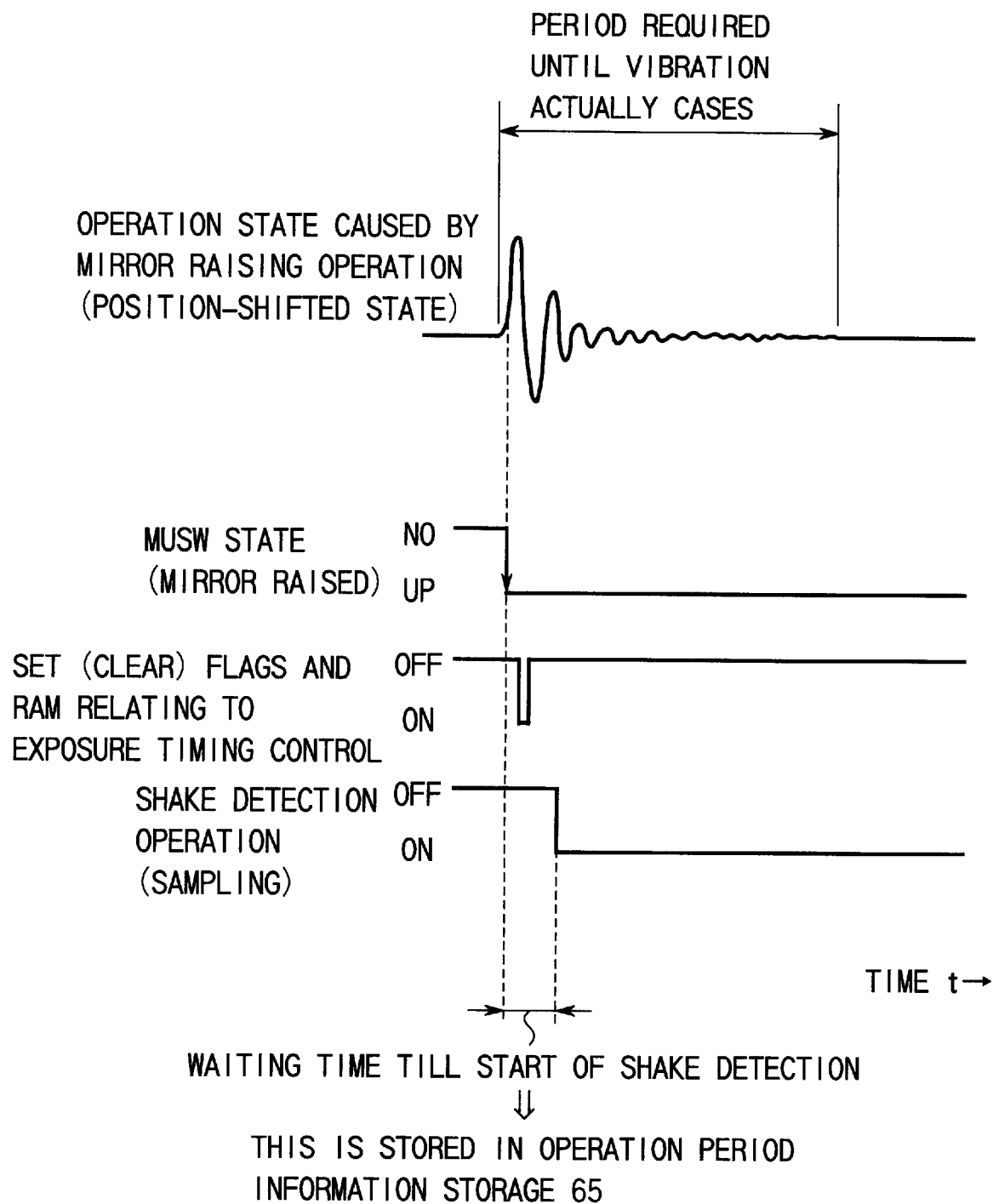
FIG. 13 is a timing chart useful in explaining a waiting period till the start of shake detection.

Referring then to the flowchart of FIG. 13, a description will be given of the above-mentioned waiting period. In FIG. 13, the top waveform indicates the state of shaking (changes in position) due to a mirror raising operation, the next waveform down indicates the state of the mirror-raising switch (corresponding to the output signal of the operation state monitoring section 63), the next waveform down indicates a time point at which the RAM and flags relating to the exposure timing control are cleared (at the step S106), and the bottom waveform indicates the ON/OFF states of the shake detecting operation (sampling operation). The abscissa indicates the time axis.

The period required until vibration caused by the mirror-raising operation actually stops is as long as several hundreds of milliseconds. If, however, shake detection (sampling) is started after the period elapses, a very long time lag occurs. To avoid this, shake detection is started after a period after which it is considered that no problem occurs in shake detecting processing, even when vibration has been generated because of the mirror-raising operation. This period is shorter than the period required until vibration caused by the mirror-raising operation actually ceases, and is stored in the operation period information storage 65.

If it is determined at the step S107 that the detection start time has been reached, a shake detection cycle timer is started (step S111). This enables sampling of shake information at regular cycles.

After that, shake information sampling corresponding to the X-axis of an imaging surface is executed by a first shake information sampling section 13 (step S112), while shake information sampling corresponding to the Y-axis of the imaging surface is executed by a second shake information sampling section 14 (step S113). Then, shake computing processing corresponding to the X-axis of an imaging surface is executed by a first shake computing section 15 (step S114), while shake computing processing corresponding to the Y-axis of the imaging surface is executed by a second shake computing section 16 (step S115). On the basis of shake information obtained by the shake computing sections 15 and 16, determination as to whether or not photography is being executed while moving the camera is executed by the "photography-with-moving-camera" determining section 7 (step S116). The method for "photography-with-moving-camera" determination will be described later.

Subsequently, the shake information corresponding to the X-axis of the imaging surface and obtained by the first shake computing section 15 is stored in a first shake information storage 41 (step S117). Similarly, the shake information corresponding to the Y-axis of the imaging surface and obtained by the second shake computing section 16 is stored in a second shake information storage 42 (step S118). Thereafter, the value of a counter B_COUNTA for counting the number of data items accumulated for shake estimation and computation (this counter constitutes a shake-information-stored-state monitoring section 45) is incremented (step S119). It is determined at the next step S120 whether or not the resultant value of the counter B_COUNTA is not less than a predetermined value. This enables determination as to whether or not each of the first and second shake information storages 41 and 42 stores not less than a predetermined number (i.e. not less than a predetermined period) of shake information items. If it is determined that the value of the counter is not less than the predetermined value, the program proceeds to a step S122, whereas if the value is less than the predetermined value, the program proceeds to a step S121.

This means that unless the predetermined number of shake information items are stored, exposure start determination cannot be executed using the shake estimation method. Therefore, if it is determined that the predetermined number of shake information items are not yet stored, the exposure start determining section 2 executes an exposure start determination operation A using the present shake information (step S121). The exposure start determination operation A will be described later in detail. If it is determined as a result of the exposure start determination operation A that exposure should be executed, a leading-curtain-drive-start start allowing flag F_GOFLAG is set at "1".

On the other hand, if the predetermined number (corresponding to the predetermined period) or more of shake information items are stored, exposure start determination using the shake estimation method is possible. In this case, shake estimation/computation corresponding to the X-axis of the imaging surface is executed by the first shake estimating/computing section 43 (step S122), and shake estimation/computation corresponding to the Y-axis of the imaging surface is executed by the second shake estimating/computing section 44 (step S123). After that, the exposure start determining section 2 executes an exposure start determination operation B using the shake estimation/computation results (step S124). The exposure start determination operation B will be described later in detail. If, also in the determination operation B, it is determined that exposure should be executed, the leading-curtain-drive-start start allowing flag F_GOFLAG is set at "1".

After the execution of the exposure start determination operations A and B, it is determined whether or not the leading-curtain-drive-start start allowing flag F_GOFLAG is set at "1" (step S125). If it is determined that the leading-curtain-drive-start start allowing flag F_GOFLAG is not "1", the value of a time lag counter B_COUNTB is incremented (step S126). Supposing that the cycle of processing from the step S111 to a step S136 described later is constant, this is equivalent to a case where time measurement is executed by the time lag measuring section 24.

After that, it is determined whether or not the value of the time lag counter B_COUNTB is not less than "150" (step S127). This means determination as to whether or not 300 milliseconds have elapsed from the start of the exposure start timing control, if the cycle of processing from the step S111 to the step S136 is, for example, 2 milliseconds. In this case, information concerning the time period is set in the time lag limit setting section 25.

If it is determined whether or not the value of the time lag counter B_COUNTB does not yet reach "150", it is further determined whether or not the value of the time lag counter B_COUNTB is not less than "51" (step S128). This means determination as to whether or not 100 milliseconds have elapsed from the start of the exposure start timing control, if the cycle of processing from the step S111 to the step S136 is, for example, 2 milliseconds. In this case, information concerning the time period is stored in the time lag information storage 26. If the stored period is not reached, i.e., if it is determined that the value of the time lag counter B_COUNTB does not yet reach "51", waiting processing is executed at a step S129 until a predetermined time period is measured by the shake detection cycle timer that is made to start a time measurement at the step S111. After the predetermined period elapses, the program returns to the step S111, thereby repeating the above-described sequential processing. The timer predetermined period is set at, for example, 2 milliseconds.

After the loop from the step S111 to the step S129 is repeated fifty times, it is determined in the 51st loop that the value of the time lag counter B_COUNTB is not less than "15". In this case, it is further determined at a step S130 whether or not the value of the time lag counter B_COUNTB is not less than "100". This means determination as to whether or not 200 milliseconds have elapsed from the start of the exposure start timing control, if the cycle of processing from the step S111 to the step S136 is, for example, 2 milliseconds. In this case, information concerning the time period is stored in the time lag information storage 26.

If it is determined that the elapsed period is less than 200 milliseconds, the program proceeds to a step S131, while if the elapsed period is not less than 200 milliseconds, the program proceeds to a step S134. Thus, if the period elapsed after the start of the exposure start timing control is between 102 milliseconds and 200 milliseconds, processes at steps S131–S133 are executed. On the other hand, if the period elapsed after the start of the exposure start timing control is not less than 200 milliseconds, processes at steps S134–S136 are executed.

Specifically, if it is determined that the value of the time lag counter B_COUNTB is not more than "100", at first, first time lag state informing is executed using the state reporting section 66 in the intra-viewfinder display section 67 (step S131). At this time, it is reported that 102 milliseconds or more have elapsed after the start of the exposure start timing control. For example, a single lighting display as indicated by (a) of FIG. 11 may be executed.

Subsequently, it is determined at a step S132 whether or not the value of the time lag counter B_COUNTB is "51". If the answer to the question at the step S132 is Yes, the program proceeds to a step S133, whereas if the answer is No, the program proceeds to the step S129. In other words, if the value of the time lag counter B_COUNTB is "51", the exposure start determining period is changed or the exposure start determining level is changed (step S133). More specifically, the determining period information set in the exposure start determination period setting section 22 is changed to a higher value, or the shake state determination level (threshold value) set in the exposure start determination level setting section 23 is changed to a higher value. This processing is executed on the assumption that even while the level of shaking is reduced by the exposure start timing control, the start of exposure can be easily allowed, thereby minimizing a possible time lag. After this changing processing, the program proceeds to the step S129.

After the above loop is repeated fifty times more, i.e. if the loop is the 101st one when it is counted from the beginning, it is determined at the step S130 that the value of the time lag counter B_COUNTB is not less than "100". In this case, second time lag informing is executed using the state reporting section 66 of the intra-viewfinder display section 67 (step S134). Specifically, the fact that 200 milliseconds or more have passed after the start of the exposure start timing control is reported. To inform this fact, it is considered to use two lighting displays as denoted by (b) of FIG. 11. The second time lag information indicates a stronger warning than the first time lag information issued at the step S131.

Subsequently, it is determined whether or not the value of the time lag counter B_COUNTB is "101" (step S135). If the answer is Yes, the program proceeds to a step S136, whereas if the answer is No, the program proceeds to the step S129. If the value of the time lag counter B_COUNTB is "101", the exposure start determining period is again changed or the exposure start determining level is again changed (step S136). More specifically, the determining period information set in the exposure start determination period setting section 22 is changed to a higher value (which is higher than the value set at the step S133), or the shake state determination level (threshold value) set in the exposure start determination level setting section 23 is changed to a higher value (which is higher than the value set at the step S133). This processing is executed on the assumption that even while the level of shaking is reduced by the exposure start timing control, the start of exposure can be allowed more easily than at the step S133, thereby further minimizing a possible time lag.

If it is determined at the step S125 that the leading-curtain-drive-start start allowing flag F_GOFLAG is "1", before the above loop is repeated 150 times, exposure is started. Accordingly, the information of the shaking level through the state reporting section 66 in the intra-viewfinder display section 67 at the step S131 or S134 is turned off (step S137).

On the other hand, if the leading-curtain-drive-start start allowing flag F_GOFLAG is not "1" even after the loop is repeated 150 times, it is determined that the exposure timing control should be finished, when it has been determined at the step S127 that the value of the time lag counter B_COUNTB has reached "150" or more, i.e. when the time lag limit has expired. In this case, a time lag limit over flag F_OVER is set at "1" (step S138), and then the program proceeds to the step S137.

After the shaking state information is stopped at the step S137, the leading-curtain-driving operation of the shutter unit 3 is started (step S139). In other words, exposure is started. At the next step S140, it is determined whether or not the period of exposure has reached a predetermined value detected by the exposure period information detecting section 53.

If it is determined that the predetermined exposure period is not yet reached, processing for detecting the level of shaking during exposure and informing it after exposure is executed. Specifically, at first, it is determined at a step S141 whether or not the shake detection cycle timer having started its operation at the step S111 has counted a predetermined period. If it is determined that the predetermined period has elapsed, the first shake information sampling section 13 executes shake information sampling in the direction of the imaging surface X-axis (step S142), and the second shake information sampling section 14 executes shake information sampling in the direction of the imaging surface Y-axis (step S143). Then, the first shake computing section 15 executes computation processing of X-axis directional shaking (step S144), while the second shake computing section 16 executes computation processing of Y-axis directional shaking (step S145). After that, the shake state determining section 51 calculates the level of blurring in an image on the basis of shake information obtained from the first and second shake computing sections 15 and 16 (step S146). Then, the program returns to the step S140. The level of blurring is obtained by, for example, integrating shake information items obtained during exposure from the first and second shake computing sections 15 and 16.

If it is determined at the step S140 that the predetermined exposure period has elapsed, the trailing-curtain-driving operation of the shutter unit 3 is started at a step S147. In other words, exposure is finished. At the next step S148, the mirror driving section 61 lowers the quick return mirror 62. Then, at a step S149, the lens stop mechanism (not shown) is released, and at a step S150, a film winding operation is executed by a film driving mechanism (not shown). It is determined at a step S151 whether or not a series of processing from the step S148 to the step S150 has been finished. If it is determined that the processing has been finished, post-exposure reporting of the state of shaking during exposure and the state of exposure start timing control (as to whether or not exposure is started, irrespective of the state of shaking, after the time lag limit has expired) is executed at a step S152. A detailed description will be given later of a method for post-exposure shake report operation. After that, the "exposure control" operation is finished, and the program returns to the main routine (RETURN).

Although "150", "51", "100", and "101" are set at the steps S127, S128 and S132, S130, and S135, the invention is not limited to these values (periods), but any other appropriate values may be set at the steps. It suffices if a common basic idea is employed between the cases.

A method for "photography-with-moving-camera" determination operation will now be described.

Figure 14A:
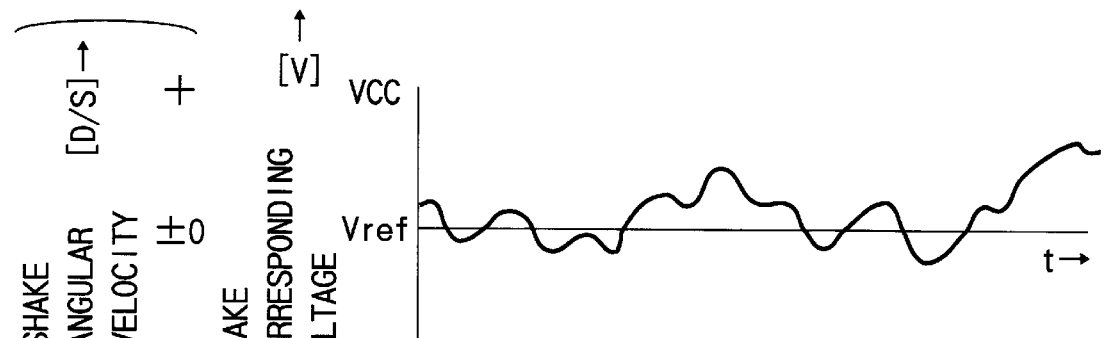
FIG. 14A is a graph showing a shake detection result (a waveform) obtained by usual photography executed with a camera held by hand.
Figure 14B:
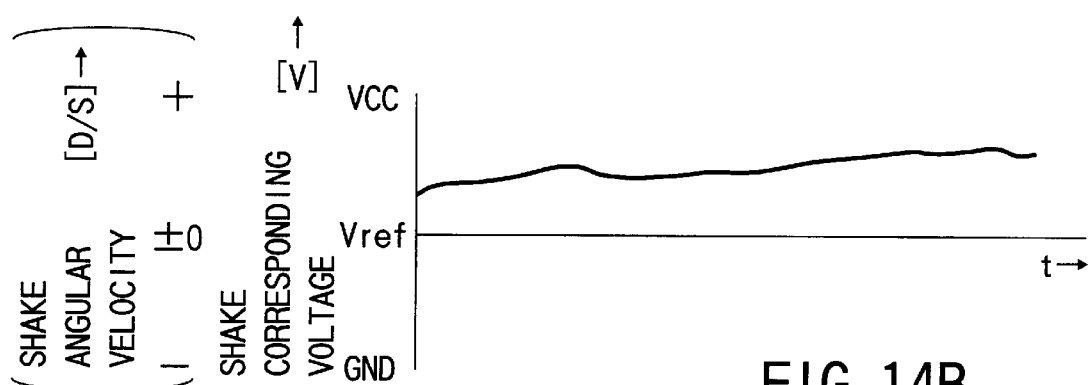
FIG. 14B is a graph showing a shake detection result (a waveform) obtained by photography executed with a slowly moving camera.
Figure 14C:
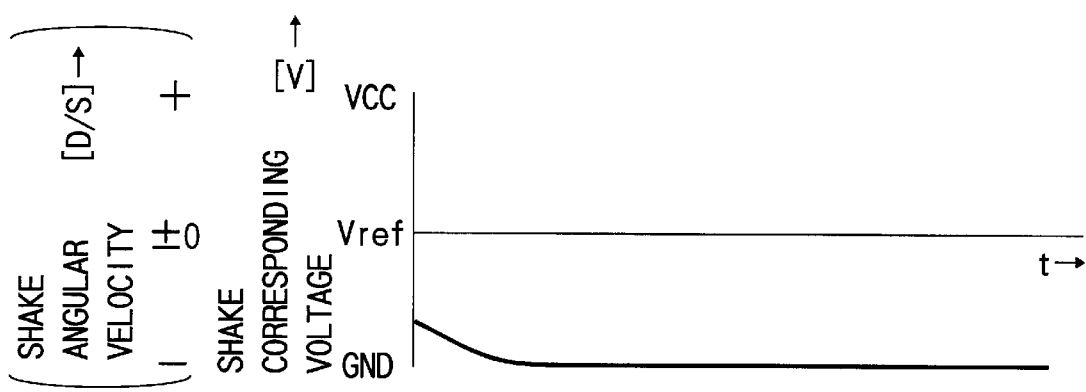
FIG. 14C is a graph showing a shake detection result (a waveform) obtained by photography executed with a quickly moving camera.

FIGS. 14A–14C show different shake detection results (waveforms) obtained from usual photography with a camera held by hand and obtained from photography with a moving camera. In FIGS. 14A–14C, the ordinate indicates the voltage [V] corresponding to the angular velocity [DEG/SEC] of shaking, Vref corresponding to a shake angular velocity of ±0. Further, the abscissa indicates time. More specifically, FIG. 14A shows an example of a waveform obtained from usual photography with a camera held by hand. FIGS. 14B and 14C show examples of waveforms obtained from photography with a moving camera.

As is understood from FIG. 14A, the shake angular velocity often crosses ±0 in the case of usual photography with a camera held by hand. On the other hand, in the case of photography with a moving camera, the shake angular velocity does not so often cross or never crosses ±0 as shown in FIGS. 14B and 14C, since the camera is being moved in a certain direction. FIG. 14B shows a waveform obtained when the camera is slowly moved, while FIG. 14C shows a waveform obtained when the camera is moved at a highest speed allowable in an analog processing system for shake detection.

Figure 15A:
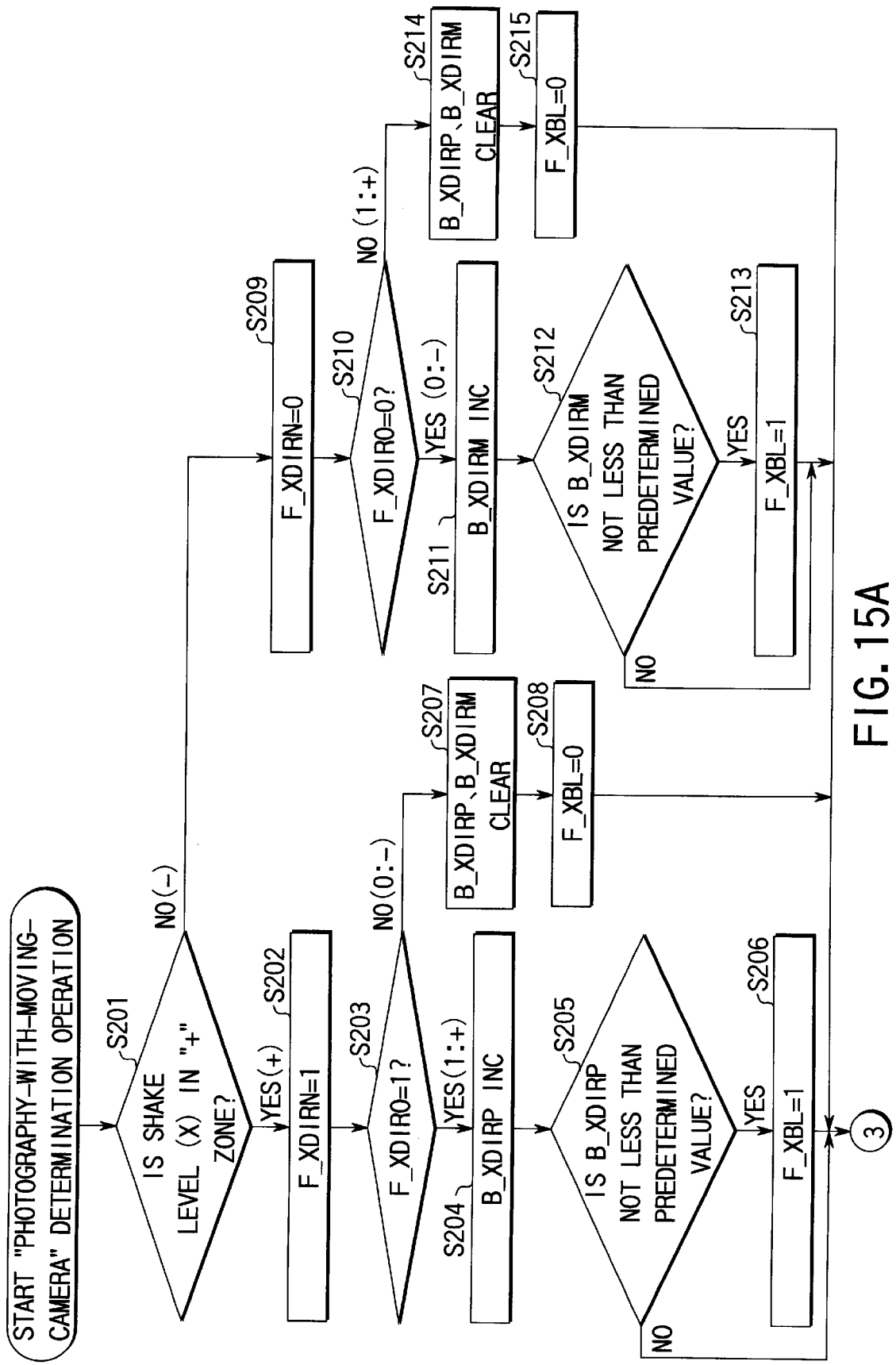
FIGS. 15A and 15B are a series of flowcharts useful in explaining the "photography-with-moving-camera" determination operation in FIG. 12B.
Figure 15B:
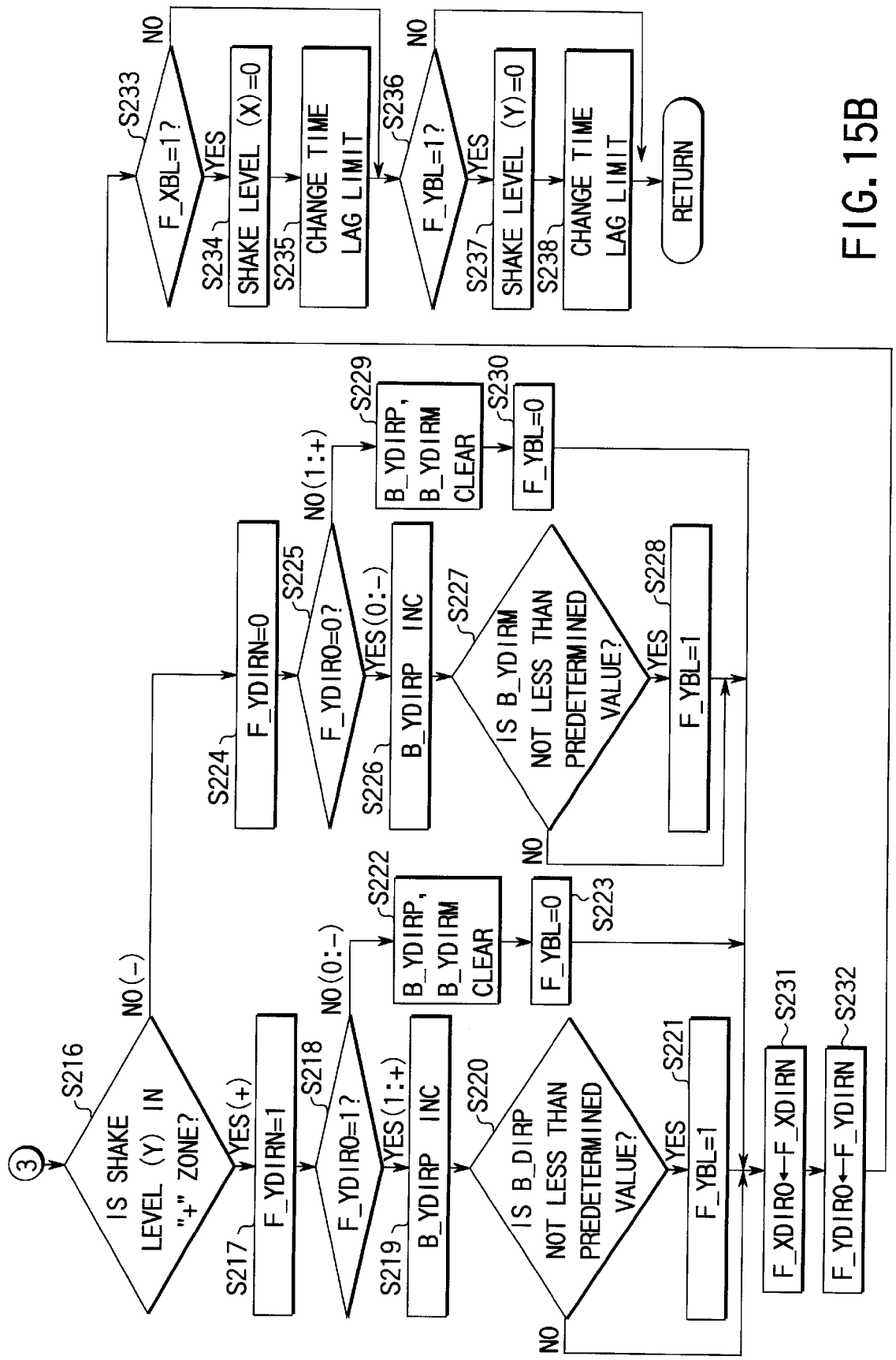

FIGS. 15A and 15B are a series of flowcharts useful in explaining a method employed at the step S116 for "photography-with-moving-camera" determination operation.

First, it is determined whether or not the present X-axis directional shake level (the output of the first shake computing section 15) has a "+" sign (step S201). In other words, it is determined whether or not the shake level is higher than the voltage Vref shown in FIGS. 14A–14C. If the level has the "+" sign, the program proceeds to the next step S202, whereas if the level does not have the "+" sign, the program proceeds to a step S209.

If the present X-axis directional shake level has the "+" sign, a shake level (X) sign flag F_XDIRN indicating the sign of the present shake level (X) is set at "1" (step S202). At the next step S203, it is determined whether or not a shake level (X) sign flag F_XDIRO indicating the sign of a shake level (X) previously sampled is set at "1" (corresponding to the "+" sign). If the shake level (X) sign flag F_XDIRO is "1", the program proceeds to the next step S204 since the present shake level and the previous shake level both have the "+" sign. On the other hand, if the shake level (X) sign flag F_XDIRO is not "1", the program proceeds to a step S207 which will be described later, since this means that the shake angular velocity has crossed ±0.

More specifically, if the shake level (X) sign flag F_XDIRO is "1", the value of a counter B_XDIRP for counting the number of shake levels (X) that exist in a "+" zone is incremented (step S204), thereby determining whether or not the incremented value of the counter B_XDIRP is not less than a predetermined value (step S205). If the value of the counter B_XDIRP is not equal to or not more than the predetermined value, the program immediately proceeds to a step S216 which will be described later. If, on the other hand, the value is not less than the predetermined value, it is determined that photography is being executed while moving the camera in the X-axis direction of the imaging surface, thereby setting, at "1", a flag F_XBL indicating photography executed while moving the camera in the X-axis direction (step S206), followed by the program proceeding to the step S216.

If it is determined at the step S203 that the shake level (X) sign flag F_XDIRO is not "1", i.e. if the shake angular velocity has crossed ±0, the counter B_XDIRP and a counter B_XDIRM for counting the number of shake levels (X) that exist in a "−" zone are cleared (step S207). After that, the flag F_XBL is set at "0" (step S208), and the program proceeds to the step S216.

On the other hand, if it is determined at the step S201 that the present X-axis directional shake level does not have the "+" sign, the shake level (X) sign flag F_XDIRN indicating the sign of the present shake level (X) is set at "0" (step S209). Then, it is determined whether or not the shake level (X) sign flag F_XDIRO indicating the sign of a shake level (X) previously sampled is "0" (corresponding to the "−" sign)(step S210). If the flag F_XDIRO is "0", the program proceeds to the next step S211, since the result means that the present shake level and the previous shake level have the same sign. If the flag is not "0", the program proceeds to a step S214 which will be described later, since the result means that the shake angular velocity has crossed ±0.

More specifically, if the shake level (X) sign flag F_XDIRO is "0", the value of the counter B_XDIRM for counting the number of shake levels (X) that exist in the "−" zone is incremented (step S211), thereby determining whether or not the incremented value of the counter B_XDIRM is not less than a predetermined value (step S212). If the value of the counter B_XDIRM is not equal to or not more than the predetermined value, the program immediately proceeds to a step S216 which will be described later. If, on the other hand, the value is not less than the predetermined value, it is determined that photography is being executed while moving the camera in the X-axis direction of the imaging surface, thereby setting, at "1", the flag F_XBL indicating photography executed while moving the camera in the X-axis direction (step S213), followed by the program proceeding to the step S216.

If it is determined at the step S210 that the shake level (X) sign flag F_XDIRO is not "0", i.e. if the shake angular velocity has crossed ±0, the counter B_XDIRP and the counter B_XDIRM are cleared (step S214). After that, the flag F_XBL is set at "0" (step S215), and the program proceeds to the step S216.

The processes at the steps S201–S215 are executed in the first "photography-with-moving-camera" state determining section 31 incorporated in the "photography-with-moving-camera" determining section 7.

The same processing as above will be executed in the Y-axis direction of the imaging surface.

First, it is determined whether or not the present Y-axis directional shake level (the output of the second shake computing section 16) has a "+" sign (step S216). In other words, it is determined whether or not the shake level is higher than the voltage Vref shown in FIGS. 14A–14C. If the level has the "+" sign, the program proceeds to the next step S217, whereas if the level does not have the "+" sign, the program proceeds to a step S224.

If the present Y-axis directional shake level has the "+" sign, a shake level (Y) sign flag F_YDIRN indicating the sign of the present shake level (Y) is set at "1" (step S217). At the next step S218, it is determined whether or not a shake level (Y) sign flag F_YDIRO indicating the sign of a shake level (Y) previously sampled is set at "1" (corresponding to the "+" sign). If the shake level (Y) sign flag F_XYIRO is "1", the program proceeds to the next step S219 since the present shake level and the previous shake level both have the "+" sign. On the other hand, if the shake level (Y) sign flag F_YDIRO is not "1", the program proceeds to a step S222 which will be described later, since this means that the shake angular velocity has crossed ±0.

More specifically, if the shake level (Y) sign flag F_YDIRO is "1", the value of a counter B_YDIRP for counting the number of shake levels (Y) that exist in the "+" zone is incremented (step S219), thereby determining whether or not the incremented value of the counter B_YDIRP is not less than a predetermined value (step S220). If the value of the counter B_YDIRP is not equal to or not more than the predetermined value, the program immediately proceeds to a step S231 which will be described later. If, on the other hand, the value is not less than the predetermined value, it is determined that photography is being executed while moving the camera in the Y-axis direction of the imaging surface, thereby setting, at "1", a flag F_YBL indicating photography executed while moving the camera in the Y-axis direction (step S221), followed by the program proceeding to the step S231 described later.

If it is determined at the step S218 that the shake level (Y) sign flag F_YDIRO is not "1", i.e. if the shake angular velocity has crossed ±0, the counter B_YDIRP and a counter B_YDIRM for counting the number of shake levels (Y) that exist in a "−" zone are cleared (step S222). After that, the flag F_YBL is set at "0" (step S223), and the program proceeds to the step S231 described later.

On the other hand, if it is determined at the step S216 that the present Y-axis directional shake level does not have the "+" sign, the shake level (Y) sign flag F_YDIRN indicating the sign of the present shake level (Y) is set at "0" (step S224). Then, it is determined whether or not the shake level (Y) sign flag F_YDIRO indicating the sign of a shake level (Y) previously sampled is "0" (corresponding to the "−" sign)(step S225). If the flag F_YDIRO is "0", the program proceeds to the next step S226, since the result means that the present shake level and the previous shake level have the same sign. If the flag is not "0", the program proceeds to a step S229 which will be described later, since the result means that the shake angular velocity has crossed ±0.

More specifically, if the shake level (Y) sign flag F_YDIRO is "0", the value of the counter B_YDIRM for counting the number of shake levels (Y) that exist in the "−" zone is incremented (step S226), thereby determining whether or not the incremented value of the counter B_YDIRM is not less than a predetermined value (step S227). If the value of the counter B_YDIRM is not equal to or not more than the predetermined value, the program immediately proceeds to the step S231 described later. If, on the other hand, the value is not less than the predetermined value, it is determined that photography is being executed while moving the camera in the Y-axis direction of the imaging surface, thereby setting, at "1", the flag F_YBL indicating photography executed while moving the camera in the Y-axis direction (step S228), followed by the program proceeding to the step S231.

If it is determined at the step S225 that the shake level (Y) sign flag F_YDIRO is not "0", i.e. if the shake angular velocity has crossed ±0, the counter B_YDIRP and the counter B_YDIRM are cleared (step S229). After that, the flag F_YBL is set at "0" (step S230), and the program proceeds to the step S231 described later.

The processes at the steps S216–S230 are executed in the second "photography-with-moving-camera" state determining section 32 incorporated in the "photography-with-moving-camera" determining section 7.

After the X-axis directional and Y-axis directional processing is finished, the value of the shake level (X) sign flag F_XDIRN indicating the sign of the present shake level (X) is written into the shake level (X) sign flag F_XDIRO indicating the sign of a shake level (X) previously sampled (step S231). Similarly, the value of the shake level (Y) sign flag F_YDIRN indicating the sign of the present shake level (Y) is written into the shake level (Y) sign flag F_YDIRO indicating the sign of a shake level (Y) previously sampled (step S232).

Subsequently, it is determined whether or not the flag F_XBL indicating photography executed while moving the camera in the X-axis direction is "1" (step S233). If the flag F_XBL is "0", the program proceeds to a step S236, which will be described later. If, on the other hand, the flag F_XBL is "1", i.e. if photography is now being executed while moving the camera in the X-axis direction, it is determined that the present shake level (X) and an estimated shake level (X) should be treated as a predetermined level (zero level) irrespective of the outputs of the first shake computing section 15 and the first shake estimating/computing section 43 (step S234). In light of the fact that photography is now being executed while moving the camera, the time lag limit set in the time lag limit setting section 25 is changed to a lower value (step S235).

After that, or if it is determined at the step S233 that the flag F_XBL indicating photography executed while moving the camera in the X-axis direction is "0", it is determined whether or not the flag F_YBL indicating photography executed while moving the camera in the Y-axis direction is "1" (step S236). If the flag F_YBL is "0", the program returns to the upper routine. On the other hand, if the flag F_YBL is "1", i.e. if photography is now being executed while moving the camera in the Y-axis direction, it is determined that the present shake level (Y) and an estimated shake level (Y) should be treated as a predetermined level (zero level) irrespective of the outputs of the second shake computing section 16 and the second shake estimating/computing section 44 (step S237). In light of the fact that photography is now being executed while moving the camera, the time lag limit set in the time lag limit setting section 25 is changed to a lower value (step S238), followed by the program returning to the upper routine.

The processes at the steps S233–S238 are executed by the exposure start determination controlling section 5. By virtue of this structure, during execution of photography while moving the camera, exposure start determination is substantially executed only on the X-axis or Y-axis directional shake level and estimated shake level, which do not relate to the movement of the camera. As a result, a time lag which will occur during photography can be minimized.

A detailed description will be given of the "exposure start determination operation B" executed at the step S124.

Referring first to the flowchart of FIG. 16, a first example of the determination operation B will be described.

First, it is determined, on the basis of the output of the first shake estimating/computing section 43, whether or not the shake level (X) has crossed the zero level (step S301). This determination is made to determine whether or not the shake angular velocity has become ±0 in FIG. 17. If the shake level (X) is not equal to or does not cross the zero level, the program proceeds to a step S305, which will be described later.

If, on the other hand, the shake level (X) has crossed the zero level, an X-directional shake level flag F_XFLAG is set at "1" (step S302). Then, it is determined whether or not a Y-directional shake level flag F_YFLAG is set at "0" (step S303). This determination is made to determine whether or not the estimated shake level (Y) has crossed the zero level (within an exposure start determination period described later). If the flag F_YFLAG is not "0", i.e. if the F_YFLAG is "1" and indicates that the estimated shake level (Y) has crossed the zero level, the program proceeds to a step S314, which will be described later. If the flag F_YFLAG is "0", i.e. if the estimated shake level (Y) dose not cross the zero level, a timer for exposure start determination is reset and started (step S304).

After that, or if it is determined at the step S301 that the shake level (X) is not equal to or does not cross the zero level, it is determined, on the basis of the output of the second shake estimating/computing section 44, whether or not the estimated shake level (Y) has crossed the zero level (step S305). This determination is made to determine whether or not the shake angular velocity has become ±0 in FIG. 17. If the estimated shake level (Y) is not equal to or does not cross the zero level, the program proceeds to a step S309, which will be described later.

If, on the other hand, the estimated shake level (Y) has crossed the zero level, the Y-directional shake level flag F_YFLAG is set at "1" (step S306). Then, it is determined whether or not the X-directional shake level flag F_XFLAG is set at "0" (step S307). This determination is made to determine whether or not the estimated shake level (X) has crossed the zero level (within an exposure start determination period described later). If the flag F_XFLAG is not "0", i.e. if the F_XFLAG is "1" and indicates that the estimated shake level (X) has crossed the zero level, the program proceeds to the step S314 described later. If the flag F_XFLAG is "0", i.e. if the estimated shake level (X) does not cross the zero level, the timer for exposure start determination is reset and started (step S308).

After that, or if it is determined at the step S305 that the shake level (Y) is not equal to or does not cross the zero level, exposure start determination period information is read from the exposure start determination period setting section 22 (step S309). At the next step S310, it is determined whether or not the timer having started at the step S304 or S308 has counted a period not less than the read exposure start determination period. This determination is made to determine whether or not both the estimated shake levels (X) and (Y) have crossed the zero level within the read exposure start determination period. If the period counted by the timer has not yet reached the read exposure start determination period, the program returns to the upper routine.

On the other hand, if it is determined that the period counted by the timer has reached the read exposure start determination period, it is further determined that the level of shaking is high, thereby setting the X-directional shake level flag F_XFLAG at "0" (step S311), and also setting the Y-directional shake level flag F_YFLAG at "0" (step S312). These flag values imply that none of the X-directional and Y-directional shake levels has crossed the zero level. Then, the timer having started at the step S304 or S308 is stopped (step S313), and the program returns to the upper routine. This means that the level of shaking is not so low, or that exposure start determination, which will be described later, has been finished.

If it is determined at the steps S303 and S307 that the Y-directional shake level flag F_YFLAG or the X-directional shake level flag F_XFLAG is "1", then it is determined that exposure should be started, since the determination results indicate that the X-directional and Y-directional estimated shake levels have crossed the zero level within the exposure start determination period. Therefore, in this case, the leading-curtain-drive-start allowing flag F_GOFLAG is set at "1" (step S314). As a result, the start of exposure is allowed at the aforementioned step S125. Thereafter, the program proceeds to the step S313 to thereby stop the timer, and then returns to the upper routine.

Figure 17:
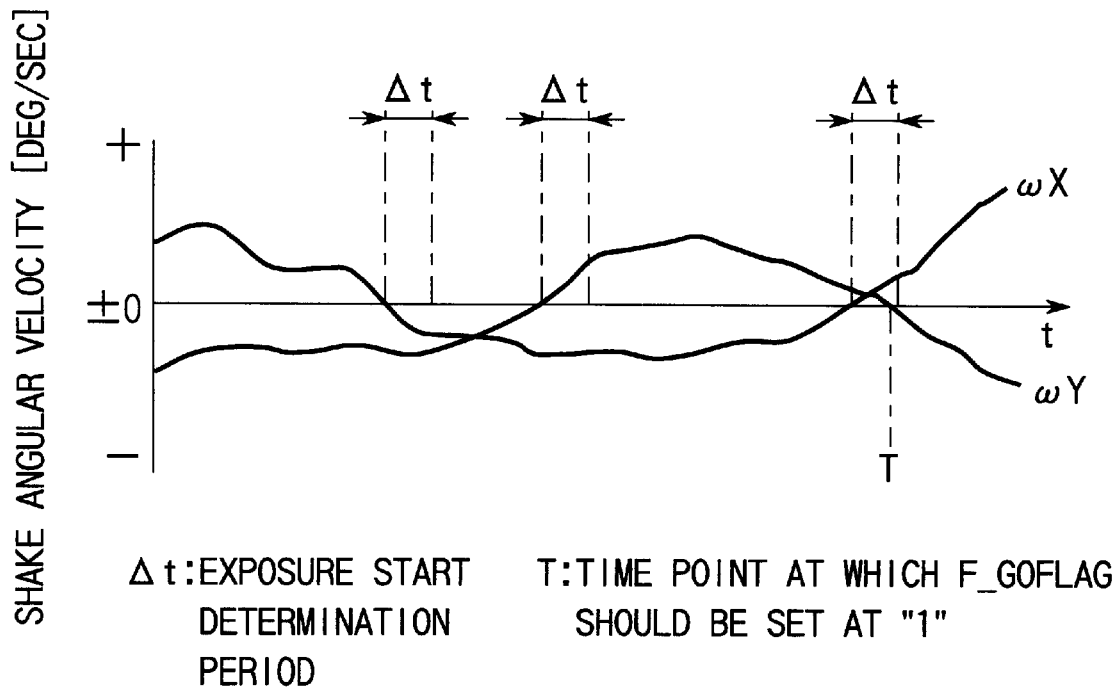
FIG. 17 is a graph illustrating the relationship between the time and the X- and Y-directional shake angular velocities, and useful in explaining the exposure start determination operation B in FIG. 16.

In FIG. 17, at a time point T, the leading-curtain-drive-start allowing flag F_GOFLAG should be set at "1". Further, "Δt" indicates the exposure start determination period.

Referring now to the flowchart of FIG. 18, a second example of the "exposure start determination operation B" executed at the step S124 will be described.

First, the exposure start determination level information set in the exposure start determination level setting section 23 is read (step S321). This information corresponds to shake angular velocities "TH+" and "TH−" in FIG. 19 and indicates shake allowable limit values. The center value ±0 between "TH+" and "TH−" corresponds to the zero level of the shake angular velocity.

On the basis of the output of the first shake estimating/computing section 43, it is determined at a step S322 whether or not the estimated shake level (X) falls within the range of "TH+"–"TH−". If the level (X) falls within the range, the X-directional shake level flag F_XFLAG is set at "1" (step S323), whereas if the level (X) does not fall within the range, the flag F_XFLAG is set at "0" (step S324).

Subsequently, on the basis of the output of the second shake estimating/computing section 44, it is determined at a step S325 whether or not the estimated shake level (Y) falls within the range of "TH+"–"TH−". If the level (Y) falls within the range, the Y-directional shake level flag F_YFLAG is set at "1" (step S326), whereas if the level (Y) does not fall within the range, the flag F_YFLAG is set at "0" (step S327).

After that, it is determined whether or not both the X-directional shake level flag F_XFLAG and the Y-directional shake level flag F_YFLAG are set at "1" (step S328). In other words, it is determined whether or not both the estimated shake levels (X) and (Y) fall within the allowable range of "TH+"–"TH−". If at least one of the levels (X) and (Y) falls within the allowable range, the program returns to the upper routine, whereas if both the levels (X) and (Y) fall within the allowable range, the leading-curtain-drive-start allowing flag F_GOFLAG is set at "1" (step S329). As a result, the start of exposure is allowed at the aforementioned step S125. Thereafter, the program returns to the upper routine.

Figure 19:
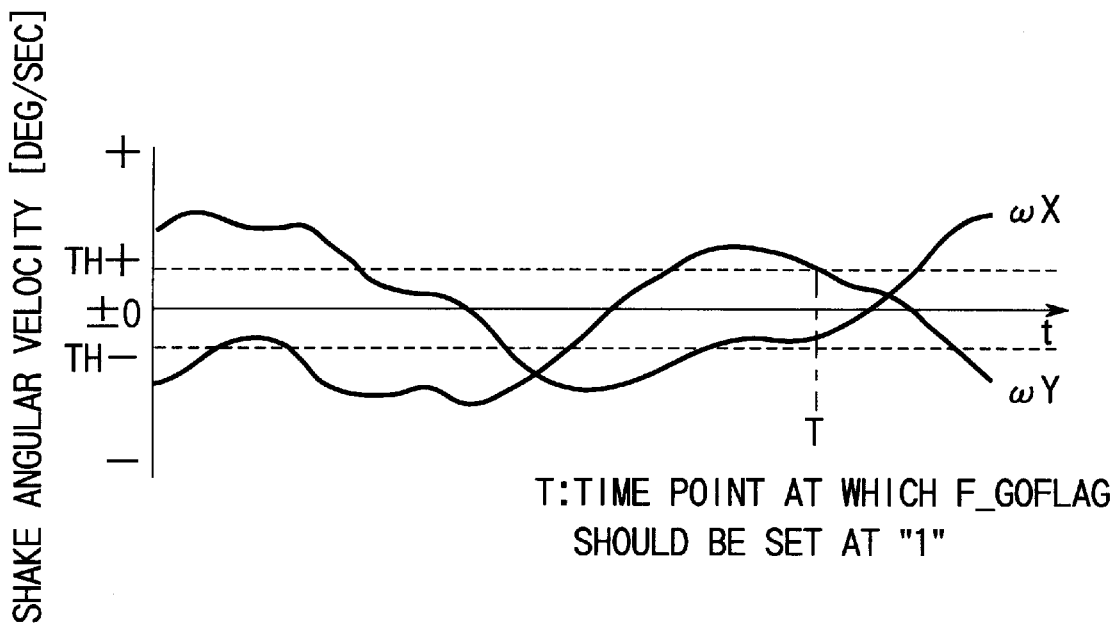
FIG. 19 is a graph illustrating the relationship between the time and the X- and Y-directional shake angular velocities, and useful in explaining the exposure start determination operation B in FIG. 18.

In FIG. 19, at a time point T, the leading-curtain-drive-start allowing flag F_GOFLAG should be set at "1".

A detailed description will be given of the "exposure start determination operation A" executed at the step S121.

Referring to the flowchart of FIG. 20, a first example of the determination operation A will be described. Since FIG. 20 includes the same processes as those employed in FIG. 16 relating to the determination operation B, only different processes will be described below.

Figure 16:
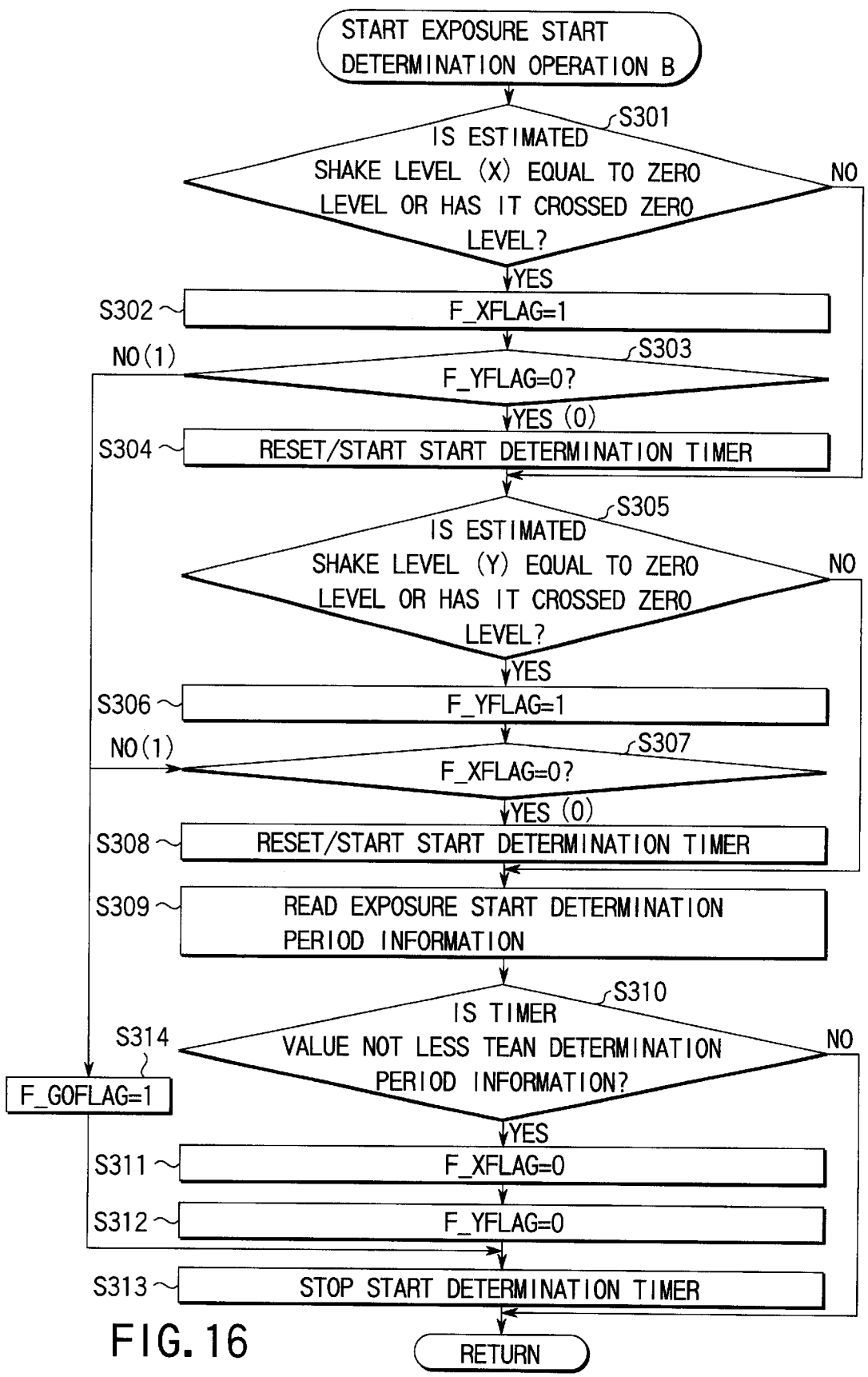
FIG. 16 is a flowchart useful in explaining an example of the exposure start determination operation B in FIG. 12B.

At the step S301 or S305 in FIG. 16, determination is executed on the basis of the estimated shake level (X) or (Y). On the other hand, at a corresponding step S401 or S405 in FIG. 20, determination is executed on the basis of the present shake level (X) or (Y), i.e. the output of the first or second shake computing section 15 or 16.

Figure 20:
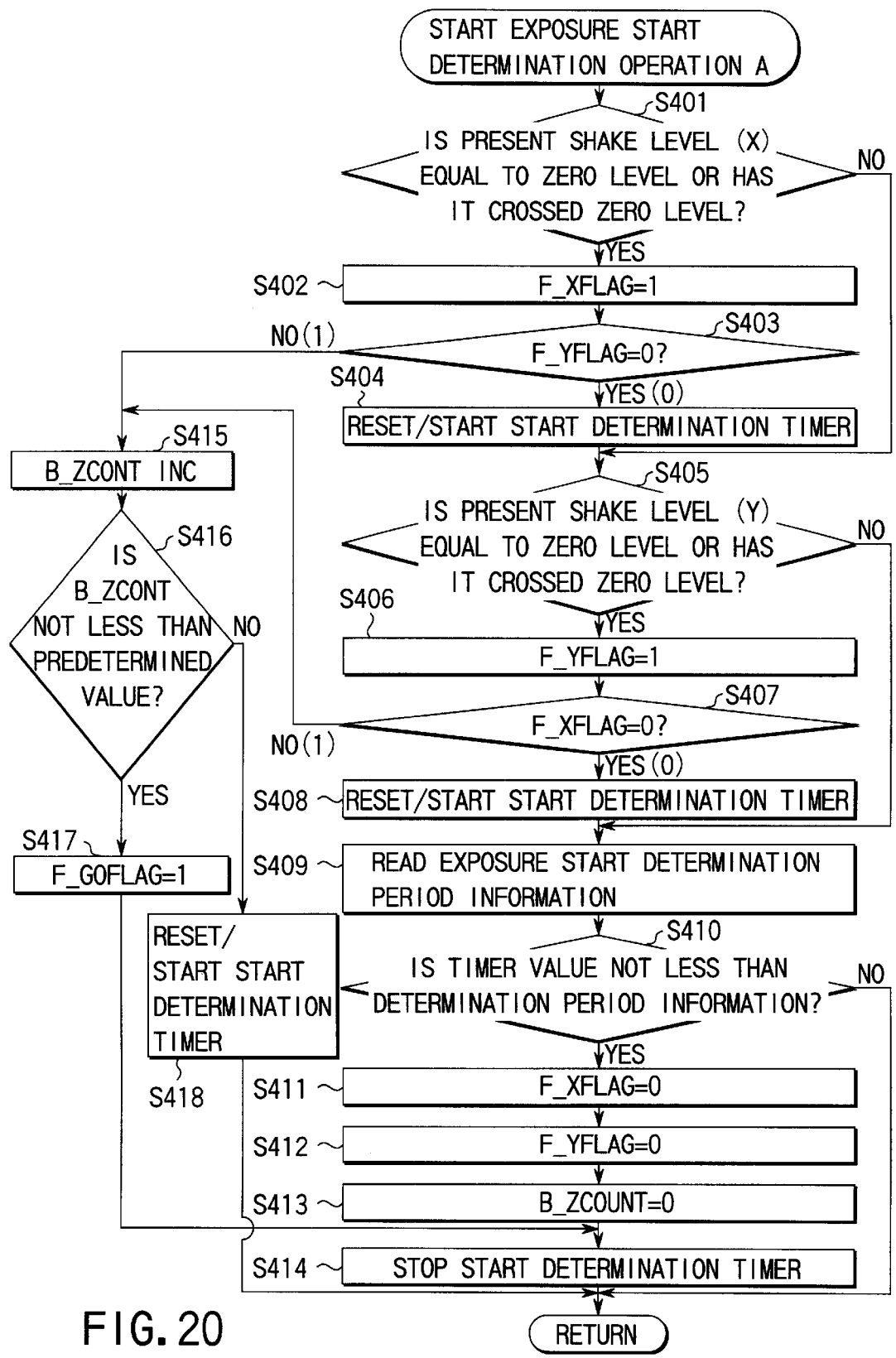
FIG. 20 is a flowchart useful in explaining an example of the exposure start determination operation A in FIG. 12B.

The case of FIG. 20 also differs from the case of FIG. 16 in processing executed, at a step S403 or S407 corresponding to the step S303 or S307, when the X-directional shake level flag F_XFLAG or the Y-directional shake level flag F_YFLAG is determined to be "1". This processing will now be described.

If it is determined that the X-directional shake level flag F_XFLAG or the Y-directional shake level flag F_YFLAG is "1", at first, the value of a continuous shake state counter B_ZCOUNT is incremented (step S415). Then, it is determined whether or not the value of the counter B ZCOUNT is not less than a predetermined value (step S416). If the value is not less than the predetermined value, the leading-curtain-drive-start allowing flag F_GOFLAG is set at "1" (step S417), followed by the program proceeding to a step S414 (corresponding to the step S313 in FIG. 16). If it is determined that the value is lower than the predetermined value, a timer for exposure start determination is reset and started at a step S418 in the same manner as at the step S304 or S308 in FIG. 16, followed by the program returning to the upper routine.

After the same determination as at the step S310 is executed at a step S410, the same processes as at the steps S311 and S312 are executed at corresponding steps S411 and S412, and then processing for clearing the contents of the continuous shake state counter B_ZCOUNT is additionally executed at a step S413. The reason why this processing is done is that a rather long time has elapsed after the shake level has crossed the zero level.

The above processing employed in FIG. 20 (relating to the exposure start determination operation A) is characterized in that the start of exposure is allowed when the present shake levels (X) and (Y) have crossed the zero level a plurality of times within the exposure start determination period. This differs from the case of FIG. 16 (relating to the exposure start determination operation B) in which the start of exposure is allowed when both the estimated shake levels (X) and (Y) have crossed the zero level within the exposure start determination period. The structure of FIG. 20 enables execution of exposure start determination even if the number of shake levels to be stored for shake estimation does not reach a predetermined value (corresponding to a predetermined period). Although in this case, it is desirable that determination should be executed on the basis of an estimation result. However, this cannot actually be realized, and hence determination is executed under more strict conditions than usual (i.e. than the determination operation B).

In FIG. 21, at a time point T, the leading-curtain-drive-start allowing flag F_GOFLAG should be set at "1". Further, "Δt" indicates the exposure start determination period. In other words, the start of exposure is allowed when the shake levels have crossed the zero level a predetermined number of times within the exposure start determination period.

Although in this embodiment, the predetermined value at the step S416 is "4", another value may be employed. Further, the structure of FIG. 20 may be modified such that the start of exposure is allowed when the shake level (X) has crossed the zero level a predetermined number of times within the exposure start determination period and the shake level (Y) has crossed the zero level a predetermined number of times within the exposure start determination period.

Referring then to the flowchart of FIG. 22, a second example of the determination operation A executed at the step S121 will be described. Since FIG. 22 includes the same processes as those employed in FIG. 18 relating to the determination operation B, only different processes will be described below.

Figure 18:
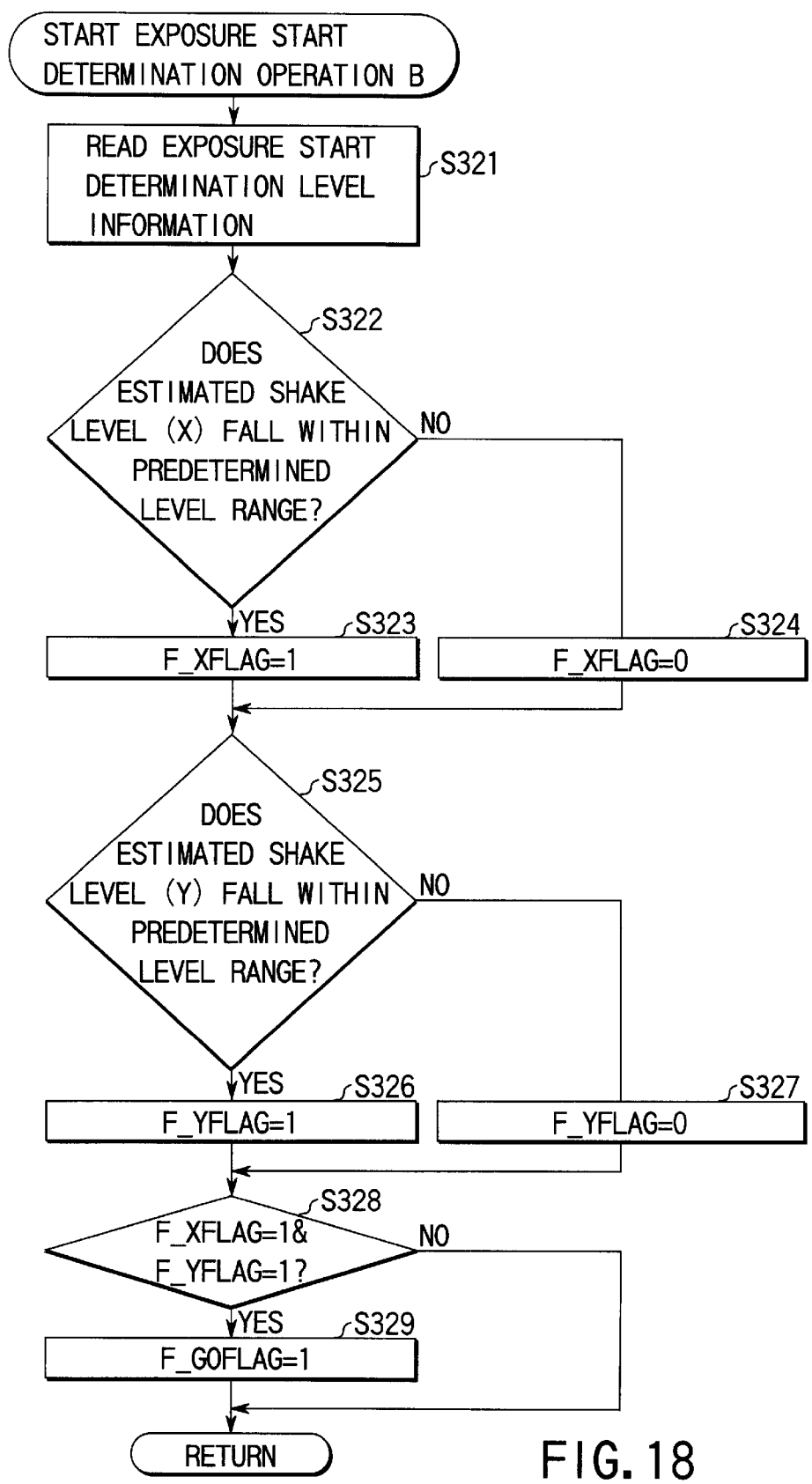
FIG. 18 is a flowchart useful in explaining another example of the exposure start determination operation B in FIG. 12B.

At the step S322 or S325 in FIG. 18, determination is executed on the basis of the estimated shake level (X) or (Y). On the other hand, at a corresponding step S422 or S425 in FIG. 22, determination is executed on the basis of the present shake level (X) or (Y), i.e. the output of the first or second shake computing section 15 or 16.

At a step S428 corresponding to the step S328, different processes are executed between a case where both the X-directional shake level flag F_XFLAG and the Y-directional shake level flag F_YFLAG are "1", and a case where at least one of the flags is not "1". This processing will now be described.

If it is determined that both the X-directional shake level flag F_XFLAG and the Y-directional shake level flag F_YFLAG are "1", at first, the value of the continuous shake state counter B_ZCOUNT is incremented (step S429). Then, it is determined whether or not the value of the counter B_ZCOUNT is not less than a predetermined value (step S430). If the value is not less than the predetermined value, the leading-curtain-drive-start allowing flag F_GOFLAG is set at "1" (step S431), followed by the program returning to the upper routine. If the value is lower than the predetermined value, the program directly returns to the upper routine.

On the other hand, if it is determined at the step S428 that at least one of the X-directional shake level flag F_XFLAG and the Y-directional shake level flag F_YFLAG is not "1", the counter B_ZCOUNT is cleared (step S432). This is because a rather long time has elapsed after the shake level has crossed the zero level. After that, the program returns to the upper routine.

Figure 22:
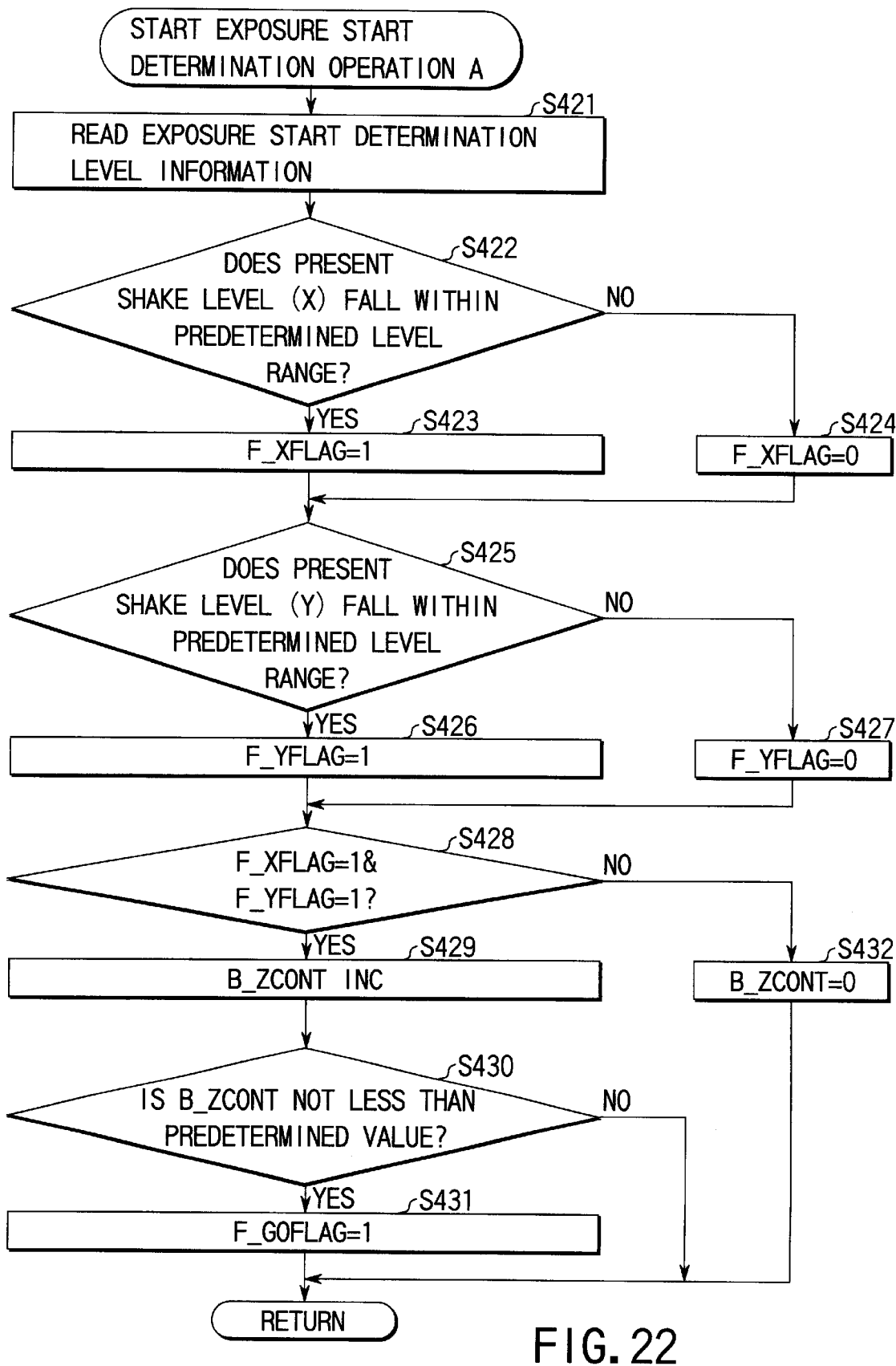
FIG. 22 is a flowchart useful in explaining another example of the exposure start determination operation A in FIG. 12B.

The above processing employed in FIG. 22 (relating to the exposure start determination operation A) is characterized in that the start of exposure is allowed when both the present shake levels (X) and (Y) continuously fall within a certain exposure start determination level range a plurality of times. This differs from the case of FIG. 18 (relating to the exposure start determination operation B) in which the start of exposure is allowed when both the estimated shake levels (X) and (Y) fall within the exposure start determination level range. The structure of FIG. 22 enables execution of exposure start determination even if the number of shake levels to be stored for shake estimation does not reach a predetermined value (corresponding to a predetermined period). Although in this case, it is desirable that determination should be executed on the basis of an estimation result. However, this cannot actually be realized, and hence determination is executed under more strict conditions than usual (i.e. than the determination operation B).

In FIG. 23, at a time point T, the leading-curtain-drive-start allowing flag F_GOFLAG should be set at "1". In other words, the start of exposure is allowed when both the shake levels (X) and (Y) continuously fall within a certain exposure start determination level range a predetermined number of times.

Although in this embodiment, the predetermined value at the step S416 is "4", another value may be employed.

Figure 24:
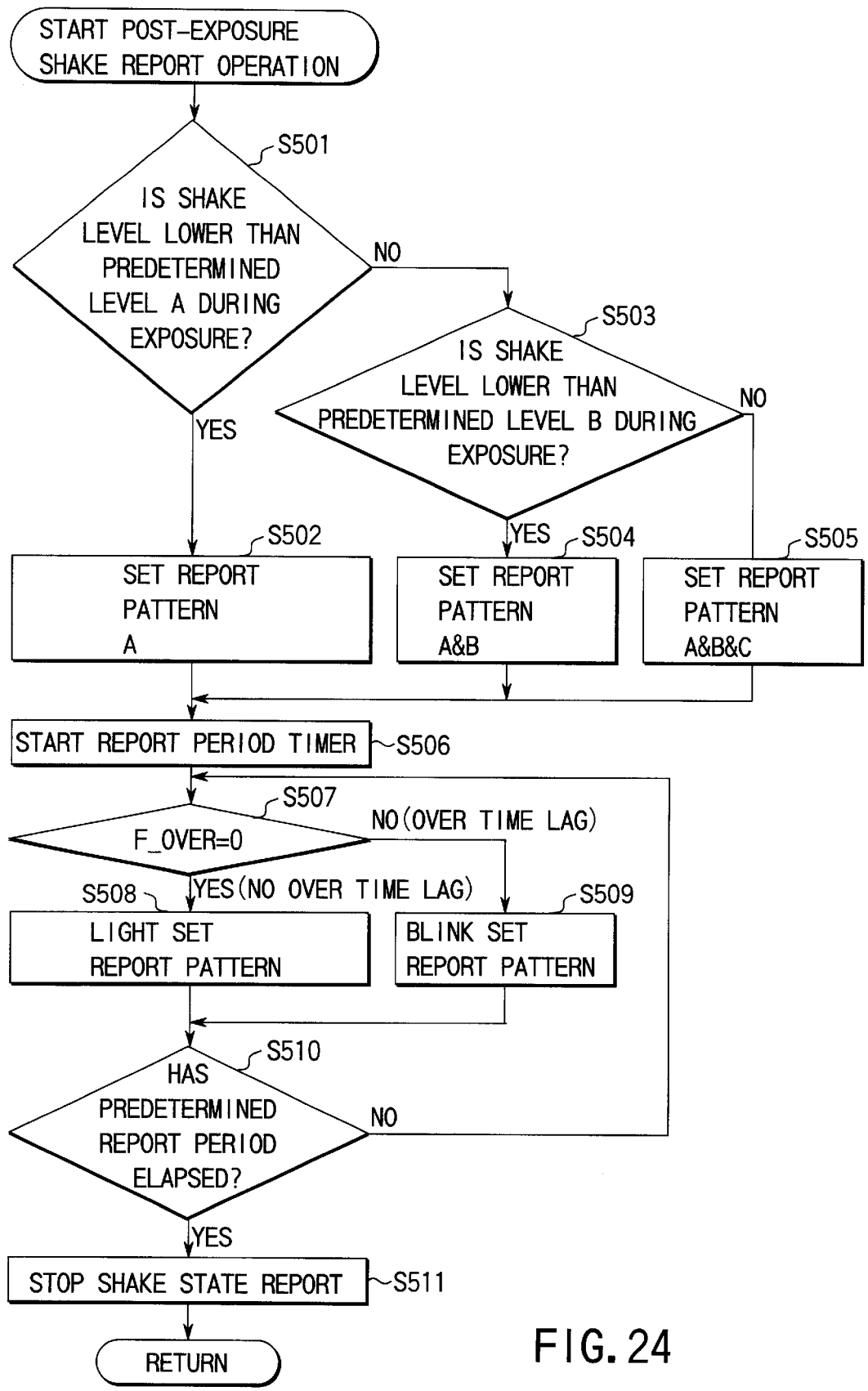
FIG. 24 is a flowchart useful in explaining the post-exposure shake report operation in FIG. 12C.

Referring now to the flowchart of FIG. 24, a method for executing "post-exposure shake report" operation at the aforementioned step S152 will be described.

First, it is determined whether or not the shake level during exposure is lower than a predetermined level A (step S501). If it is lower than the predetermined level A, a report pattern A is set (step S502), followed by the program proceeding to a step S506.

If, on the other hand, the shake level during exposure is not lower than the predetermined level A, it is then determined at a step S503 whether or not the shake level during exposure is lower than a predetermined level B. If it is lower than the predetermined level B, a report pattern B is set at a step S504, followed by the program proceeding to a step S506, which will be described later. On the other hand, if the shake level during exposure is not lower than the predetermined level B, a report pattern C is set at a step S505, followed by the program proceeding to the step S506 described later.

There are report patterns as shown in, for example, FIG. 11. In this case, the report pattern A corresponds to a pattern indicated by (a) of FIG. 11, the report pattern B to a pattern indicated by (b) of FIG. 11, and the report pattern C to a pattern indicated by (c) of FIG. 11.

The shake level used at the step S501 or S503 corresponds to the final shake level obtained at the aforementioned step S146. Further, the predetermined levels A and B correspond to, for example, 50 $\mu$m and 100 $\mu$m on a 35 mm film, respectively. It is sufficient if it can be discriminated, from the report patterns, whether blurring in an image resulting from shaking is at as low a level as can be ignored by the photographer, or at a level as to be slightly worrying, or at as high a level as to be significantly worrying.

After the report pattern is set, a timer for executing a post-exposure shake report for a predetermined period is started at a step S506. After this, it is determined whether or not the time lag limit over flag F_OVER is set at "0" (step S507).

If the time lag limit over flag F_OVER is set at "0", this means that there is no over time lag, i.e. that exposure has been started after shaking has been reduced, and therefore the state reporting section 66 is lit in the form of the report pattern set at the step S502, S504 or S505 (step S508).

On the other hand, if the time lag limit over flag F_OVER is set at "1", this means that there is an over time lag, i.e. that exposure has been started so the photographer will not misunderstand that the camera is out of order, although shaking has not yet been reduced. In this case, the state reporting section 66 is blinked in the form of the report pattern set at the step S502, S504 or S505 (step S509). This blinking informs the photographer that exposure has been started after a time lag limit (i.e. exposure has been executed with a high level of shaking), which means that photography has been executed at a time point different from the photographer's target time point and therefore that it is highly possible that blurring occurs in a photograph.

After starting the lighting or blinking of the state reporting section, it is determined at a step S510 whether or not the report period timer having started at the step S506 has counted a predetermined period. If it is determined that the predetermined period has not yet elapsed, the program returns to the step S507. The predetermined period is, for example, 300 mSEC.

After the predetermined period elapses, the post-exposure shake report by the state reporting section 66 is turned off (step S511), followed by the program returning to the upper routine.

Although the present invention has been described with reference to an embodiment thereof, it is not limited to the embodiment, but may be modified in various manners without departing from its scope.

For example, in the above embodiment, one of two exposure start determining methods is selectively used for exposure start determination, on the basis of the value of the counter B_COUNTA for counting the number of data items accumulated for shake estimation and computation. However, instead of the two exposure start determining methods, three or more exposure start determining methods may be used. Further, the exposure start determining method may be selected on the basis of, for example, a predetermined time point as well as the value of the counter B_COUNTA.

Moreover, although the embodiment relates to a single-lens reflex camera, the invention is not limited to this type of camera.

In addition, the invention is also applicable to a so-called digital camera, which picks up an image of a to-be-photographed object using an imaging element and stores the image in a storage medium.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera with a blur reducing function, comprising:

shake detecting/computing means for detecting and computing a shake state of the camera;

exposure start determining means for executing exposure start determination to reduce shaking during exposure, on the basis of an output of said shake detecting/computing means;

exposure means for executing an exposure operation in accordance with a determination result of said exposure start determining means;

exposure-start-determining-method changing means for changing an exposure start determination method used in said exposure start determining means; and condition setting means for setting a condition used in said exposure-start-determining-method changing means for changing the exposure start determination method used in said exposure start determining means;

wherein said condition setting means includes camera control means for controlling all operations of the camera, and said exposure-start-determining-method changing means changes the exposure start determination method used in said exposure start determining means in response to an instruction from said camera control means; and wherein said exposure start determining means uses different exposure start determination methods for the output of said shake detecting/computing means and for an output obtained by estimation based on the output of said shake detecting/computing means.

2. A camera with a blur reducing function, comprising:

shake detecting/computing means for detecting and computing a shake state of the camera;

exposure start determining means for executing exposure start determination to reduce shaking during exposure, on the basis of an output of said shake detecting/computing means;

exposure means for executing an exposure operation in accordance with a determination result of said exposure start determining means;

exposure-start-determining-method changing means for changing an exposure start determination method used in said exposure start determining means; and condition setting means for setting a condition used in said exposure-start-determining-method changing means for changing the exposure start determination method used in said exposure start determining means;

wherein said condition setting means includes camera control means for controlling all operations of the camera, and said exposure-start-determining-method changing means changes the exposure start determination method used in said exposure start determining means in response to an instruction from said camera control means, and wherein said exposure-start-determining-method changing means changes an exposure start determination algorithm used in said exposure start determining means.

3. A camera with a blur reducing function, comprising:

shake detecting/computing means for detecting and computing a shake state of the camera;

exposure start determining means for executing exposure start determination to reduce shaking during exposure, on the basis of an output of said shake detecting/computing means;

exposure means for executing an exposure operation in accordance with a determination result of said exposure start determining means;

exposure-start-determining-method changing means for changing an exposure start determination method used in said exposure start determining means; and condition setting means for setting a condition used in said exposure-start-determining-method changing means for changing the exposure start determination method used in said exposure start determining means;

wherein said condition setting means includes "photography-with-moving-camera" determining means for determining whether or not photography is being executed while moving the camera, and wherein said exposure-start-determining-method changing means changes the exposure start determination method used in said exposure start determining means, in response to an output from said "photography-with-moving-camera" determining means.

4. The camera according to claim 3, wherein said "photography-with-moving-camera" determining means determines whether or not photography is being executed while moving the camera, on the basis of said shake state detected by the shake detecting/computing means.

5. The camera according to claim 3, wherein said exposure-start-determining-method changing means changes the output of said shake detecting/computing means to a predetermined value when said "photography-with-moving-camera" determining means determines that photography is being executed while moving the camera.

6. The camera according to claim 3, wherein said "photography-with-moving-camera" determining means determines whether or not photography is being executed while moving the camera, on the basis of a level of shaking in each of two directions perpendicular to a photography optical axis of the camera and intersecting each other, and said exposure-start-determining-method changing means changes the output of said shake detecting/computing means to a predetermined value, the output corresponding to that one of the two directions in which photography is determined to be being executed while moving the camera.

7. The camera according to claim 3, wherein said exposure start determining means finishes exposure start determination based on the output of said shake detecting/computing means and starts the exposure operation of said exposure means irrespective of a shake state of the camera, when a time limit set by said exposure-start-determining-method changing means has expired, and said exposure-start-determining-method changing means changes the time limit when said "photography-with-moving-camera" determining means determines that photography is being executed while moving the camera.

8. A camera with a blur reducing function, comprising:

shake detecting/computing means for detecting and computing a shake state of the camera;

exposure start determining means for executing exposure start determination to reduce shaking during exposure, on the basis of an output of said shake detecting/computing means;

exposure means for executing an exposure operation in accordance with a determination result of said exposure start determining means;

exposure-start-determining-method changing means for changing an exposure start determination method used in said exposure start determining means; and condition setting means for setting a condition used in said exposure-start-determining-method changing means for changing the exposure start determination method used in said exposure start determining means;

wherein said condition setting means includes time lag measuring means for measuring a time lag by which said exposure start determining means retards an operation of said exposure means, and wherein said exposure-start-determining-method changing means changes the exposure start determination method used in said exposure start determining means, in accordance with an output from said time lag measuring means.

9. The camera according to claim 8, wherein said shake detecting/computing means detects a shake level in each of two directions substantially perpendicular to a photography optical axis of the camera and intersecting each other, and said exposure-start-determining-method changing means changes determination period information indicating a determination period required to determine whether or not both the shake levels in the two directions reach a predetermined value.

10. The camera according to claim 8, wherein said exposure-start-determining-method changing means changes determination level information indicating a determination level, on the basis of which the output of said shake detecting/computing means is determined.

11. A camera with a blur reducing function, comprising:

shake detecting/computing means for detecting and computing a shake state of the camera;

shake estimating means for storing an output of said shake detecting/computing means and estimating a level of shaking on the basis of the stored output;

shake information stored state monitoring means for monitoring a shake information stored state of said shake estimating means;

exposure start determining means for executing exposure start determination to reduce shaking during exposure, on the basis of an output of said shake detecting/computing means or an output of said shake estimating means;

exposure means for executing an exposure operation in accordance with a determination result of said exposure start determining means; and exposure-start-determining-method changing means for changing an exposure start determination method used in said exposure start determining means, on the basis of a monitoring result of said shake information stored state monitoring means.

12. The camera according to claim 11, wherein said exposure start determining means uses different exposure start determination methods for the output of said shake detecting/computing means and for the output of said shake estimating means.

13. The camera according to claim 11, wherein said exposure-start-determining-method changing means changes an exposure start determination algorithm used in said exposure start determining means.

14. A camera with a blur reducing function, comprising:

a shake detecting section for sampling shake levels of the camera in a time series manner;

a computing section for receiving a predetermined number of shake data items sampled by said shake detecting section in the time series manner, and executing predetermined computation of the shake data items; and a photography start timing determining section for comparing latest shake data, output from said shake detecting section, with a first determination reference range, and comparing a computation result, when output from said computing section, with a second reference range different from the first reference range, thereby determining on the basis of comparison results whether or not photography should be started.

15. The camera according to claim 14, wherein the first determination reference range has a narrower determination allowance width than the second determination reference range.

16. A camera with a blur reducing function including a shake detecting section for repeatedly detecting a shake state of the camera, and in which a shake state of the camera is repeatedly detected in response to a releasing operation for instructing start of photography, and photography is started at a time point at which shaking is in a predetermined state, comprising:

a determination reference range setting section for setting first and second reference ranges which are different from each other;

a shake estimating section for estimating a shake state of the camera to be obtained after a predetermined period, on the basis of a predetermined number of shake data items detected by said shake detecting section; and a photography start timing determining section for comparing latest shake data, output from said shake detecting section, with a first determination reference range until estimation information is output form said shake estimating section, and comparing the estimation information with the second reference range when the estimation information is output, thereby determining on the basis of comparison results whether or not photography should be started.

17. The camera according to claim 16, wherein the first determination reference range has a narrower determination allowance width than the second determination reference range.

18. A camera with a blur reducing function, comprising:

a shake data sampling section, responsive to a releasing operation, for sampling, in a time series manner, a shake level in each of two directions perpendicular to a photography optical axis of the camera and intersecting each other;

a "photography-with-moving-camera" determining section for determining, on the basis of an output of said shake data sampling section, whether or not photography is being executed while moving the camera, and invalidating data which is included in the output of said shake data sampling section and concerns a direction in which the camera is moving; and a control section for starting photography when the output of said shake data sampling section satisfies a predetermined reference value, or when a predetermined period has elapsed after the releasing operation.

19. The camera according to claim 18, wherein said control section changes the predetermined period to a shorter period when said "photography-with-moving-camera" determining section determines that photography is being executed while moving the camera.

20. A camera for detecting levels of shaking in a plurality of directions in response to a releasing operation, and starting photography at a time point at which shaking is at a low level, comprising:

a shake level detecting, responsive to a releasing operation, for detecting levels of shaking in a plurality of directions; and a control section for determining, on the basis of levels of shaking in the plurality of directions detected by said shake level detecting section, whether or not photography is being executed while moving the camera, the control section invalidating a shake state signal obtained in a direction in which photography is being executed while moving the camera.

21. A camera with a blur reducing function, comprising:

a time measuring section, responsive to a releasing operation, for starting to measure a time period and stop it when a predetermined time limit expires;

a shake detecting section for repeatedly detecting a shake level of the camera; and a photography start timing determining section for starting photography, when the predetermined time limit has expired or while time measurement is executed before the predetermined time limit expires, in accordance with a comparison result between a predetermined reference range and an estimated level of shaking which is obtained, after a predetermined period, on the basis of a plurality of shake data items including the detected shake level and shake levels near the detected shake level, wherein said photography start timing determining section increases the predetermined period each time comparison has been executed.

22. A camera with a blur reducing function, comprising:

a time measuring section, responsive to a releasing operation, for starting to measure a time period and stop it when a predetermined time limit expires;

a shake detecting section for repeatedly detecting a shake level of the camera; and a photography start timing determining section for starting photography, when the predetermined time limit has expired or while time measurement is executed before the predetermined time limit expires, in accordance with a comparison result between a predetermined reference range and an estimated level of shaking which is obtained, after a predetermined period, on the basis of a plurality of shake data items including the detected shake level and shake levels near the detected shake level, wherein said photography start timing determining section widens the predetermined reference range each time comparison is executed.

23. A method of reducing blurring in a photograph taken by a camera which has a sensor for detecting a shake state of the camera and can reduce shaking during exposure, comprising:

a first step of sampling levels of shaking in a time series manner on the basis of an output of the sensor;

a second step of receiving a predetermined number of shake data items sampled in the time series manner, thereby executing predetermined computation of the shake data items;

a third step of comparing latest shake data, output from the sensor, with a first determination reference range;

a fourth step of comparing a computation result, when output at said second step, with a second determination reference range different from the first determination reference range; and a fifth step of determining, on the basis of a comparison result at said third step or said fourth step, whether or not exposure should be started.

24. The method according to claim 23, wherein the first determination reference range has a narrower determination allowance width than the second determination reference range.

* * * * *